(12) United States Patent
Mutlu et al.

(10) Patent No.: US 12,320,642 B2
(45) Date of Patent: *Jun. 3, 2025

(54) WEARABLE SKIN VIBRATION OR SILENT GESTURE DETECTOR

(71) Applicant: Apple Inc., Cupertino, CA (US)

(72) Inventors: Mehmet Mutlu, Grover Beach, CA (US); Ahmet Fatih Cihan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,840

(22) Filed: Jan. 16, 2024

(65) Prior Publication Data

US 2024/0159512 A1 May 16, 2024

Related U.S. Application Data

(63) Continuation of application No. 17/894,571, filed on Aug. 24, 2022, now Pat. No. 11,906,303, which is a
(Continued)

(51) Int. Cl.
*G01B 9/02* (2022.01)
*G06F 3/01* (2006.01)
(Continued)

(52) U.S. Cl.
CPC ......... *G01B 9/02092* (2013.01); *G06F 3/017* (2013.01); *G06F 3/167* (2013.01); *H04R 1/1091* (2013.01); *H04R 2460/13* (2013.01)

(58) Field of Classification Search
CPC .... G01B 9/02092; G01B 11/161; G01B 9/02; G06F 3/017; G06F 3/167; G06F 3/011;
(Continued)

(56) References Cited

U.S. PATENT DOCUMENTS

| 4,254,333 A | 3/1981 | Bergström |
| 4,468,131 A | 8/1984 | Bui et al. |

(Continued)

FOREIGN PATENT DOCUMENTS

| CN | 101592762 | 12/2009 |
| CN | 102109650 | 6/2011 |

(Continued)

OTHER PUBLICATIONS

Diao et al., "High-speed high-resolution heterodyne interferometer using a laser with low beat frequency," *Applied Optics*, vol. 55, No. 1, 2015, pp. 110-116.

*Primary Examiner* — Yosef K Laekemariam
(74) *Attorney, Agent, or Firm* — Brownstein Hyatt Farber Schreck, LLP

(57) ABSTRACT

Disclosed herein are wearable devices, their configurations, and methods of operation that use self-mixing interferometry signals of a self-mixing interferometry sensor to recognize user inputs. The user inputs may include voiced commands or silent gesture commands. The devices may be wearable on the user's head, with the self-mixing interferometry sensor configured to direct a beam of light toward a location on the user's head. Skin deformations or vibrations at the location may be caused by the user's speech or the user's silent gestures and recognized using the self-mixing interferometry signal. The self-mixing interferometry signals may be used for bioauthentication and/or audio conditioning of received sound or voice inputs to a microphone.

18 Claims, 19 Drawing Sheets

Related U.S. Application Data continuation of application No. 16/849,826, filed on Apr. 15, 2020, now Pat. No. 11,473,898.

(60) Provisional application No. 62/852,481, filed on May 24, 2019.

(51) Int. Cl.
*G06F 3/16* (2006.01)
*H04R 1/10* (2006.01)

(58) Field of Classification Search
CPC ... G06F 3/012; G06F 3/01; G06F 3/16; H04R 1/1091; H04R 2460/13; H04R 5/033; H04R 1/10
See application file for complete search history.

(56) References Cited

U.S. PATENT DOCUMENTS

| | | |
|---|---|---|
| 4,913,547 A | 4/1990 | Moran |
| 5,500,708 A | 3/1996 | Ohsawa |
| 5,565,986 A | 10/1996 | Knuttel |
| 5,781,297 A | 7/1998 | Castore |
| 5,825,465 A | 10/1998 | Nerin et al. |
| 6,233,045 B1 | 5/2001 | Suni et al. |
| 6,531,767 B2 | 3/2003 | Shrauger |
| 6,724,486 B1 | 4/2004 | Shull et al. |
| 6,816,523 B1 | 11/2004 | Glenn et al. |
| 6,872,931 B2 | 3/2005 | Liess et al. |
| 6,885,438 B2 | 4/2005 | Deines |
| 7,139,446 B2 | 11/2006 | Slotwinski |
| 7,184,445 B2 | 2/2007 | Guenter |
| 7,277,180 B2 | 10/2007 | Townley-Smith et al. |
| 7,336,368 B2 | 2/2008 | Liao et al. |
| 7,366,217 B2 | 4/2008 | Guenter et al. |
| 7,388,672 B2 | 6/2008 | Zhou et al. |
| 7,509,050 B2 | 3/2009 | Ekkizogloy et al. |
| 7,557,795 B2 | 7/2009 | Kong et al. |
| 7,589,709 B2 | 9/2009 | Liess et al. |
| 7,620,332 B2 | 11/2009 | Nishiyama |
| 7,667,851 B2 | 2/2010 | Dubois et al. |
| 7,675,020 B2 | 3/2010 | Machida |
| 7,684,957 B2 | 3/2010 | Ueno |
| 7,995,193 B2 | 8/2011 | Kuwata |
| 8,174,597 B2 | 5/2012 | Ogasawara |
| 8,208,814 B2 | 6/2012 | Sheth et al. |
| 8,248,615 B2 | 8/2012 | Ueno |
| 8,378,287 B2 | 2/2013 | Schemmann et al. |
| 8,405,902 B2 | 3/2013 | Irie |
| 8,416,424 B2 | 4/2013 | Werner et al. |
| 8,444,331 B2 | 5/2013 | Kobayashi |
| 8,446,592 B1 | 5/2013 | Arissian |
| 8,529,460 B2 | 9/2013 | Kawano et al. |
| 8,537,341 B2 | 9/2013 | Ueno |
| 8,736,581 B2 | 5/2014 | Han et al. |
| 8,751,091 B2 | 6/2014 | Moench et al. |
| 8,781,687 B2 | 7/2014 | Han et al. |
| 8,896,745 B2 | 11/2014 | Takachi |
| 8,942,069 B2 | 1/2015 | Tortora |
| 9,004,698 B2 | 4/2015 | Kilcher et al. |
| 9,068,916 B2 | 6/2015 | Heng |
| 9,091,573 B2 | 7/2015 | Van Der Lee et al. |
| 9,091,747 B2 | 7/2015 | Pruijmboom |
| 9,146,304 B2 | 9/2015 | Land et al. |
| 9,160,390 B2 | 10/2015 | Zhou et al. |
| 9,170,088 B2 | 10/2015 | Lim et al. |
| 9,420,155 B2 | 8/2016 | Brodie |
| 9,459,352 B2 | 10/2016 | Becker et al. |
| 9,588,586 B2 | 3/2017 | Rihn |
| 9,648,221 B2 | 5/2017 | Seo et al. |
| 9,658,113 B2 | 5/2017 | Bosch et al. |
| 9,677,986 B1 | 6/2017 | Baldwin et al. |
| 9,703,173 B2 | 7/2017 | Brodie |
| 9,726,474 B2 | 8/2017 | Royo Royo et al. |
| 9,772,398 B2 | 9/2017 | Bikumandla et al. |
| 9,778,037 B2 | 10/2017 | Bestler |
| 9,911,890 B2 | 3/2018 | Renard et al. |
| 9,912,923 B2 | 3/2018 | Kilcher et al. |
| 9,952,245 B2 | 4/2018 | Ueno |
| 9,995,877 B2 | 6/2018 | Nakamura |
| RE46,930 E | 7/2018 | Mimeault |
| 10,070,799 B2 | 9/2018 | Ang et al. |
| 10,184,783 B2 | 1/2019 | Flanders et al. |
| 10,215,555 B2 | 2/2019 | Chen et al. |
| 10,222,474 B1 | 3/2019 | Raring et al. |
| 10,317,651 B2 | 6/2019 | Furutake et al. |
| 10,379,028 B2 | 8/2019 | Spruit et al. |
| 10,386,554 B2 | 8/2019 | Hjelmstrom et al. |
| 10,492,679 B2 | 12/2019 | Zhou |
| 10,503,048 B2 | 12/2019 | Del Bino et al. |
| 10,555,079 B2 * | 2/2020 | Bakish .............. G10L 21/0216 |
| 10,613,625 B2 | 4/2020 | Huang et al. |
| 10,614,295 B2 | 4/2020 | Kim et al. |
| 10,635,800 B2 | 4/2020 | Bakish |
| 10,581,474 B1 | 6/2020 | Fishman et al. |
| 10,705,211 B2 | 7/2020 | Jacobs et al. |
| 10,718,922 B2 | 7/2020 | Yong et al. |
| 10,791,283 B2 | 9/2020 | Bardagjy et al. |
| 10,824,275 B2 | 11/2020 | Mutlu et al. |
| 10,845,873 B2 | 11/2020 | Huang |
| 10,866,083 B2 | 12/2020 | Van Der Lee et al. |
| 10,871,820 B2 | 12/2020 | Mutlu et al. |
| 10,871,836 B2 | 12/2020 | Dashevsky |
| 10,970,556 B2 | 4/2021 | Teich et al. |
| 11,022,835 B2 | 6/2021 | Jamali et al. |
| 11,036,318 B2 | 6/2021 | Kuboyama et al. |
| 11,073,615 B2 | 7/2021 | Chua et al. |
| 11,092,480 B2 | 8/2021 | Garrett et al. |
| 11,092,531 B2 | 8/2021 | Spruit et al. |
| 11,112,233 B2 | 9/2021 | Mutlu et al. |
| 11,150,332 B1 | 10/2021 | Chen et al. |
| 11,156,456 B2 | 10/2021 | Chen et al. |
| 11,157,113 B2 | 10/2021 | Winkler et al. |
| 11,175,700 B1 | 11/2021 | Poole |
| 11,243,068 B1 | 2/2022 | Mutlu et al. |
| 11,243,686 B2 | 2/2022 | McCord |
| 11,280,714 B2 | 3/2022 | Momtahan et al. |
| 11,327,008 B2 | 5/2022 | Venturini et al. |
| 11,360,440 B2 | 6/2022 | Perkins et al. |
| 11,422,638 B2 | 8/2022 | Mutlu et al. |
| 11,460,293 B2 | 10/2022 | Chen et al. |
| 11,494,926 B1 | 11/2022 | Wu |
| 11,549,799 B2 | 1/2023 | Tan et al. |
| 11,629,948 B2 | 4/2023 | Shou et al. |
| 11,692,925 B2 | 7/2023 | Spruit et al. |
| 11,740,071 B2 | 8/2023 | Huang et al. |
| 11,822,095 B2 | 11/2023 | Park et al. |
| 11,846,525 B2 | 12/2023 | Chen et al. |
| 2005/0156874 A1 | 7/2005 | Kong |
| 2005/0157971 A1 | 7/2005 | Juijve |
| 2006/0239312 A1 | 10/2006 | Kewitsch et al. |
| 2008/0007713 A1 | 1/2008 | Zijp |
| 2008/0123106 A1 | 5/2008 | Zeng et al. |
| 2009/0002829 A1 | 1/2009 | Shinohara |
| 2011/0126617 A1 | 6/2011 | Bengoechea Apezteguia et al. |
| 2011/0267467 A1 | 11/2011 | Kimura et al. |
| 2011/0301455 A1 | 12/2011 | Numajiri et al. |
| 2012/0262722 A1 | 10/2012 | Lim et al. |
| 2012/0281221 A1 | 11/2012 | Studer et al. |
| 2013/0063718 A1 | 3/2013 | Bernal et al. |
| 2014/0293055 A1 | 10/2014 | Otsuka |
| 2015/0309568 A1 | 10/2015 | Miki |
| 2016/0021285 A1 | 1/2016 | Nadler et al. |
| 2017/0192133 A1 | 7/2017 | Murakami et al. |
| 2017/0343817 A1 | 11/2017 | Bietry et al. |
| 2017/0344812 A1 * | 11/2017 | Kim .............. G06V 40/174 |
| 2018/0027339 A1 | 1/2018 | Blumkin et al. |
| 2018/0073924 A1 | 3/2018 | Steinmann et al. |
| 2018/0081434 A1 | 3/2018 | Siddiqui et al. |
| 2018/0232511 A1 * | 8/2018 | Bakish .............. G06F 21/32 |
| 2019/0146065 A1 | 5/2019 | Jutte et al. |
| 2019/0317454 A1 | 10/2019 | Holenarsipur et al. |
| 2019/0319157 A1 | 10/2019 | Coffy et al. |
| 2020/0370879 A1 | 11/2020 | Mutlu et al. |

(56) References Cited

U.S. PATENT DOCUMENTS

| | | |
|---|---|---|
| 2021/0015350 A1 | 1/2021 | Butte et al. |
| 2021/0104873 A1 | 4/2021 | Gerlach |
| 2021/0116355 A1 | 4/2021 | Spruit et al. |
| 2021/0294489 A1 | 9/2021 | Li et al. |
| 2022/0074844 A1 | 3/2022 | D'Apuzzo et al. |
| 2022/0155052 A1 | 5/2022 | Mutlu et al. |
| 2022/0202515 A1 | 6/2022 | Itkowitz et al. |
| 2022/0404138 A1 | 12/2022 | Mutlu et al. |
| 2023/0087691 A1 | 3/2023 | Chen et al. |
| 2023/0314185 A1 | 10/2023 | Chen et al. |
| 2023/0366672 A1 | 11/2023 | Huang et al. |
| 2024/0003671 A1 | 1/2024 | Jin et al. |
| 2024/0004034 A1 | 1/2024 | Chen et al. |

FOREIGN PATENT DOCUMENTS

| | | |
|---|---|---|
| CN | 105223579 | 1/2016 |
| CN | 107564924 | 1/2018 |
| CN | 108225543 | 6/2018 |
| CN | 108692663 | 4/2020 |
| EP | 3598591 | 1/2020 |
| EP | 3796140 | 3/2021 |
| GB | 2441557 A | 3/2008 |
| GB | 2443662 | 5/2008 |
| JP | 2004504634 A | 2/2004 |
| JP | 2005528682 | 9/2005 |
| JP | 2009222573 | 10/2009 |
| JP | 2010511883 A | 4/2010 |
| JP | 2010526315 | 7/2010 |
| JP | 2011523700 | 8/2011 |
| JP | 2012521003 | 9/2012 |
| JP | 2013508717 | 3/2013 |
| JP | 2014078823 | 5/2014 |
| JP | 2014534459 | 12/2014 |
| JP | 2015078946 | 4/2015 |
| JP | 2019515258 | 6/2019 |
| JP | 2019121691 | 7/2019 |
| KR | 101792588 | 10/2012 |
| WO | WO 05/013517 | 2/2005 |
| WO | WO 09/156937 | 12/2009 |
| WO | WO 10/139144 | 12/2010 |
| WO | WO 17/178711 | 10/2017 |
| WO | WO 18/036685 | 3/2018 |
| WO | WO 19/015623 | 1/2019 |
| WO | WO 19/042953 | 3/2019 |

* cited by examiner

WEARABLE SKIN VIBRATION OR SILENT GESTURE DETECTOR

CROSS-REFERENCE TO RELATED APPLICATIONS

This application is a continuation of U.S. patent application Ser. No. 17/894,571, filed Aug. 24, 2022, which is a continuation of U.S. patent application Ser. No. 16/849,826, filed Apr. 15, 2020, now U.S. Pat. No. 11,473,898, which is a nonprovisional and claims the benefit under 35 U.S.C. § 119(e) of U.S. Provisional Patent Application No. 62/852,481, filed May 24, 2019, the contents of which are incorporated herein by reference as if fully disclosed herein.

FIELD

The present disclosure generally relates to wearable electronic devices. The wearable electronic devices are equipped with self-mixing interferometry sensors for detection of user inputs and/or user input commands. The self-mixing interferometry sensors may detect the user inputs by detecting skin deformations or skin vibrations at one or more locations on a user's head. The skin deformations or skin vibrations may be caused by a user's voiced or silent speech or head motion.

BACKGROUND

Wearable electronic devices, such as smart watches or headphones, are often configured to receive user inputs or commands by detecting a user's voice, or a user's press at a button or on an input screen. The voiced input command may be received by a microphone of the wearable electronic device.

Each of these input processes has potential limitations. Voice recognition software must distinguish the user's or wearer's voice from background noise or voices of others, and press or force inputs require a user's hands to be free. Also, a user may be unable to input a command to the wearable electronic device without being heard.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Disclosed herein are wearable electronic devices and user input detection systems for wearable electronic devices. The wearable electronic devices (or "wearable devices", or "devices") may be equipped with one or more self-mixing interferometry sensors operable to detect a user input or user command by detecting skin deformation or skin vibrations at a location on the user, such as on the head of the user.

More specifically, described herein is a wearable device that includes: a frame configured to attach the wearable device to a user; a self-mixing interferometry sensor mounted to the frame and configured to emit a beam of light; and a command interpreter configured to receive a self-mixing interferometry signal from the self-mixing interferometry sensor. The frame may be configured to direct the beam of light toward the head of the user. The self-mixing interferometry signal may include skin deformation information. The command interpreter may be configured to identify a command encoded in the skin deformation information.

In additional and/or alternative embodiments, the skin deformation information may include skin vibration information. The device may be configured as an earbud that also includes a microphone and an in-ear speaker. The self-mixing interferometry sensor may direct the beam of light toward a location in an ear of the user, and the command interpreter may be operable to identify a voiced command of the user using the skin vibration information.

In additional and/or alternative embodiments, the skin deformation information may include skin vibration information. The device may be configured as an eyeglasses set, with the self-mixing interferometry sensor mounted to an arm of the eyeglasses set. The self-mixing interferometry sensor may direct the beam of light toward a location proximate to the temporal bone of the user. The command interpreter may be operable to identify a voiced command of the user based on the skin vibration information.

In additional and/or alternative embodiments, skin deformation information may include temporomandibular joint movement information. The device may be configured as a headphone, with at least one self-mixing interferometry sensor mounted on the headphone to direct the beam of light toward a location on the user's head proximate to the temporomandibular joint of the user. The command interpreter may be operable to identify the temporomandibular joint movement information as a silent gesture command of the user.

In additional and/or alternative embodiments, the skin deformation information may include temporomandibular joint movement information. The device may be configured as a visual display headset, with at least a first and a second self-mixing interferometry sensor. The first self-mixing interferometry sensor may direct its beam of light toward a location on the user's head proximate to a temporomandibular joint of the user, and the second self-mixing interferometry sensor may direct its beam of light toward a location on the user's head proximate to the parietal bone. The command interpreter may be configured to receive respective first and second self-mixing interferometry signals from the first and second self-mixing interferometry sensors. The command interpreter may be configured to detect a silent gesture command of the user using the first self-mixing interferometry signal and to detect a voiced command of the user using the second self-mixing interferometry signal.

Also described herein is a device that may include: a head-mountable frame that is configured to be worn by a user; a self-mixing interferometry sensor mounted to the head-mountable frame and operable to emit a beam of light toward a location on the user's head; a microphone; a command interpreter configured to receive an output of the microphone and recognize a voiced command of the user; and a bioauthentication circuit configured to authenticate the voiced command using a self-mixing interferometry signal of the self-mixing interferometry sensor.

In additional and/or alternative embodiments, the self-mixing interferometry signal may include skin deformation information. The bioauthentication circuit may be operable to detect, using at least the skin deformation information, that the user was speaking during a time interval of the received output of the microphone and authenticate the voiced command using the detection. The authentication of the voiced command may include detecting a correlation between the voiced command of the user and a voice pattern of the user detected in the skin deformation information.

In some embodiments, the device may be an earbud that includes an in-ear speaker and a radio transmitter. The device may transmit the voiced command using the radio transmitter upon authentication of the voiced command.

In some embodiments, the device may be a headphone, and the location on the user's head may be proximate to at least one of a temporal bone and the parietal bone of the user. The device may transmit the voiced command using the radio transmitter upon authentication of the voiced command.

Also described herein is a device that may include: a head-mountable frame configured to be worn by a user; a self-mixing interferometry sensor mounted to the head-mountable frame and operable to emit a beam of light toward a location on the user's head; a microphone configured to produce an audio signal; and an audio conditioning circuit configured to modify the audio signal using a self-mixing interferometry signal of the self-mixing interferometry sensor.

In any or all of these various embodiments, the beam of light may be produced by a laser diode. The various embodiments may use a time-domain I/Q analysis of the self-mixing interferometry signal. Such a time-domain I/Q analysis includes applying a sine wave modulation to the laser diode's bias current. Alternatively or in conjunction, the various embodiments may use a spectrum analysis of the self-mixing interferometry signal when a triangle wave modulation is applied to the laser diode's bias current. In yet another implementation, a constant (D.C.) driving of the laser diode's bias current may also be used.

BRIEF DESCRIPTION OF THE DRAWINGS

The disclosure will be readily understood by the following detailed description in conjunction with the accompanying drawings, wherein like reference numerals designate like structural elements.

Figure 1:
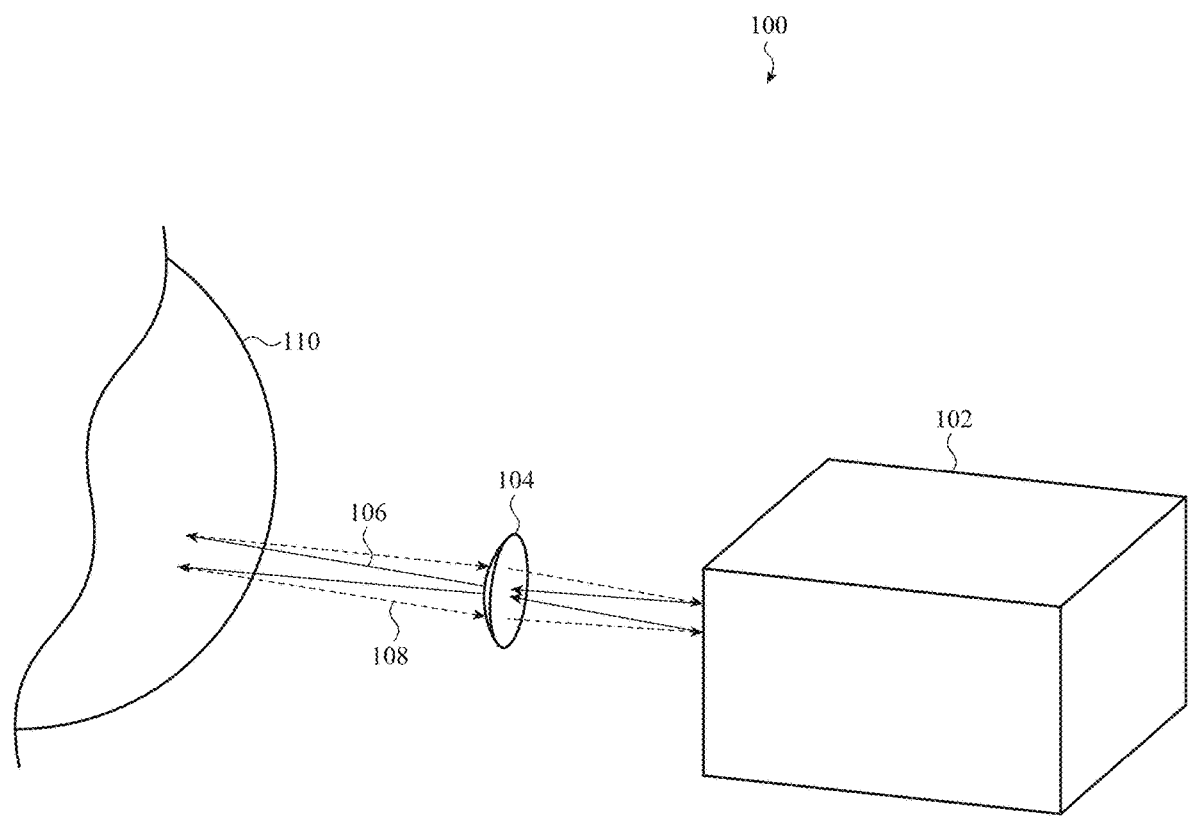
FIG. 1 illustrates a self-mixing interferometry sensor emitting a coherent light beam at a location on a head of a user, according to an embodiment.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to wearable devices that can detect and respond to user inputs. The user inputs may include either or both of voiced (audible) commands or silent (inaudible) gesture commands of a user. As used herein, a "command," whether voiced or a silent gesture, is to be understood as any of: a user instruction to the device to change the device's operation, an input of data or other information to the device by the user, or another user input to affect the state of the wearable device itself or of an associated electronic device. The embodiments described herein may also be used to record audible or inaudible communications other than commands. The wearable device may include a self-mixing interferometry sensor that uses self-mixing interferometry to detect the voiced or silent gesture commands, or other voiced or silent communications.

In self-mixing interferometry, a beam of light (visible or invisible) is emitted by a light source of the self-mixing interferometry sensor toward an object. Reflections or backscatters of the emitted beam of light from an object may be received in the light source and cause the light source to enter an altered steady state in which the emitted light is different from light emitted without received reflections. As the distance or displacement of the object from the self-mixing interferometry sensor varies, corresponding variations in the altered state of the self-mixing interferometry sensor are induced. These induced alterations produce detectable variations in a signal of the self-mixing interferometry sensor that allow the distance, displacement, motion, velocity, or other parameters of the object to be determined.

In various embodiments described herein, the wearable device may be worn or attached to a user, such as on the user's head. The user's voiced or silent gesture commands may induce skin deformations, such as skin vibrations. For example, audible speech by the user may induce skin vibrations at one or more locations on the scalp or head of the user. A silent gesture of the user, such as inaudibly forming a word with the jaw and tongue without exhaling, may induce skin deformations at one or more locations on the scalp or head of the user. The skin deformations may be detected by a self-mixing interferometry sensor mounted on a frame of the wearable device.

Specific embodiments described in further detail below include a microphone equipped earbud, in which the self-mixing interferometry sensor detects the user's speech or voice based on skin vibrations at a location in the user's ear. In a variation, the earbud may not have a conventional microphone. Instead, the self-mixing interferometry sensor may function for detecting sound inputs. In a second embodiment, an over the ear(s) headphone may include one or multiple self-mixing interferometry sensors that may detect the user's voiced commands or silent gestures from skin deformations at locations proximate to the parietal bone, one of the temporal bones, one of the temporomandibular joints, or another location on the user's head. In a third embodiment, an eyeglass frame may include a self-mixing interferometry sensor that may detect skin deformations proximate to the temporal bone. A fourth embodiment relates to a visual display headset, such as may be used by a mixed reality, an augmented reality, or virtual reality (AR/VR) user headset. The AR/VR headset may include multiple self-mixing interferometry sensors that may detect the user's voiced commands or silent gestures from skin deformations at locations proximate to the parietal bone, one of the temporal bones, one of the temporomandibular joints, or another location on the user's head. These embodiments are listed as examples, and are not intended to limit the embodiments of this disclosure.

Detected skin deformations may be used in various ways. One use is to recognize or identify a command, whether it be input to the wearable device as a voiced command or as a silent gesture command. Skin deformations such as skin vibrations from voiced commands may be correlated with a known voice pattern of the user. This can allow the voiced command to be recognized and accepted by the device even when the voiced command is not accurately detected by a microphone (such as may occur in the presence of background noise).

Another use is for bioauthentication of received commands. As an example, a self-mixing interferometry sensor may detect skin vibrations when the user is speaking, and so allow the device to accept the command as it is heard by a microphone of the wearable device. If the self-mixing interferometry sensor does not detect skin deformations or skin vibrations above a threshold, the device may ignore an audible input detected by its microphone. In this way, the device can disregard unwanted voiced commands not made by the actual user.

In still another use, a self-mixing interferometry signal may be used for audio conditioning. For example, a user's speech recorded by a microphone may contain background noise. A self-mixing interferometry signal may allow the device to determine the intended voiced command, and can transmit (such as to another person or device) a reduced noise version of the voiced command.

These and other embodiments are discussed below with reference to FIGS. 1-11. However, those skilled in the art will readily appreciate that the detailed description given herein with respect to these figures is for explanatory purposes only and should not be construed as limiting.

FIG. 1 illustrates a block diagram of a system 100 by which a wearable electronic device may operate to detect user inputs by detecting or measuring skin deflections or deformations at a location on a user's body. The block diagram of the system 100 is representational only, and does not imply any information regarding dimensions or shape of the features shown. Examples of such electronic devices include, but are not limited to, an earbud, a headphone, an eyeglass frame, or a mixed reality, an augmented reality or virtual reality (AR/VR) headset. These exemplary wearable electronic devices will be explained in further detail below in relation to FIGS. 3A-B. The skin deformation may be caused by voiced or silent commands issued by the user to affect operation of a wearable electronic device.

The wearable electronic device may include a self-mixing interferometry sensor 102. The self-mixing interferometry sensor 102 is configured to emit an outgoing beam of light 106 directed toward a location on a user's head 110. The outgoing beam of light 106 may pass through an optional collimating or other lens 104 for focusing and/or filtering prior to impinging on a location of the user's head 110. Reflections or backscatter 108 of the outgoing beam of light 106 from the user's head 110 may reflect back into the light source within the self-mixing interferometry sensor 102 and alter a property of the outgoing emitted beam of light 106.

In some embodiments, the light source within the self-mixing interferometry sensor 102 may be a laser diode in which the received reflections 108 of the beam of light 106 induce self-mixing interference within the laser diode's lasing cavity. The self-mixing interference produces an altered steady state of operation of the laser diode from a state of operation that would occur in the absence of received reflections 108. For example, the emitted optical power of the beam of light or emitted wavelength may be altered. Such an alteration may be detectable as a change in an operational parameter (or "interferometric parameter") of the source of the beam of light 106, or of an associated electrical component of the electronic device. A particular type of laser diode that may be used in a self-mixing interferometry sensor is a vertical cavity, surface emitting laser (VCSEL) diode. Structural and operational details regarding VCSELs are described below. One skilled in the art will recognize that other types of laser diodes or light sources may be used in the self-mixing interferometry sensors described herein.

Motion of the location on the user's head 110 may be caused by the user's speech, such as a voiced command, or by a silent gesture of the user. Examples of locations on the user's head 110 include the skin or scalp proximate to temporomandibular joints, the temporal bones, the parietal bone, or another location. As an example, speech by the user may cause vibrations in the temporal bones, which in turn may cause vibrations in the skin proximate to the temporal bones. The skin vibrations may be detected by the self-mixing interferometry sensor 102 of the device.

Figure 2A:
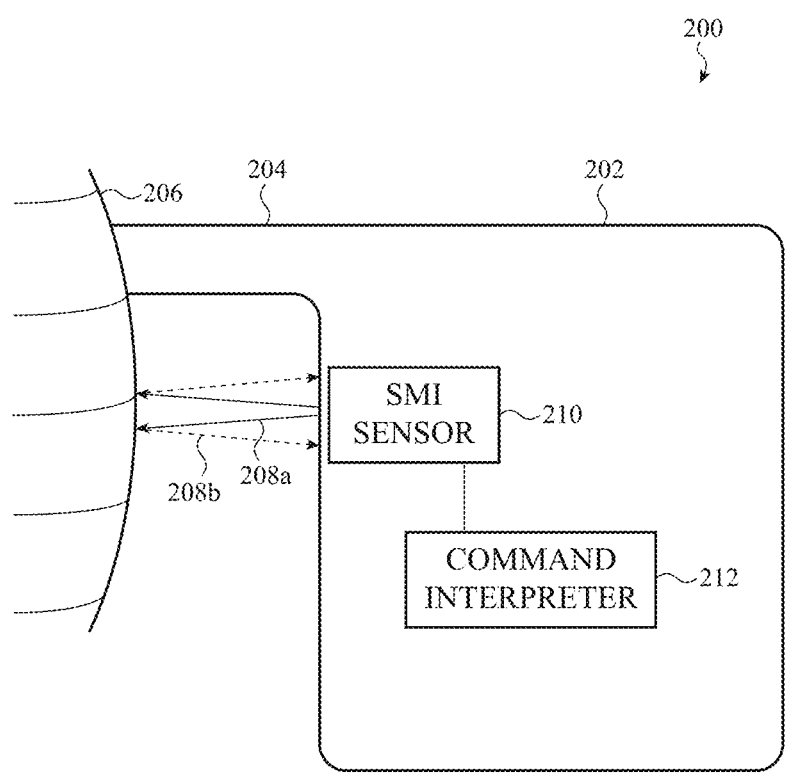
FIG. 2A illustrates a block diagram of the components of a wearable device, in relation to part of a user's head, according to an embodiment.
Figure 2B:
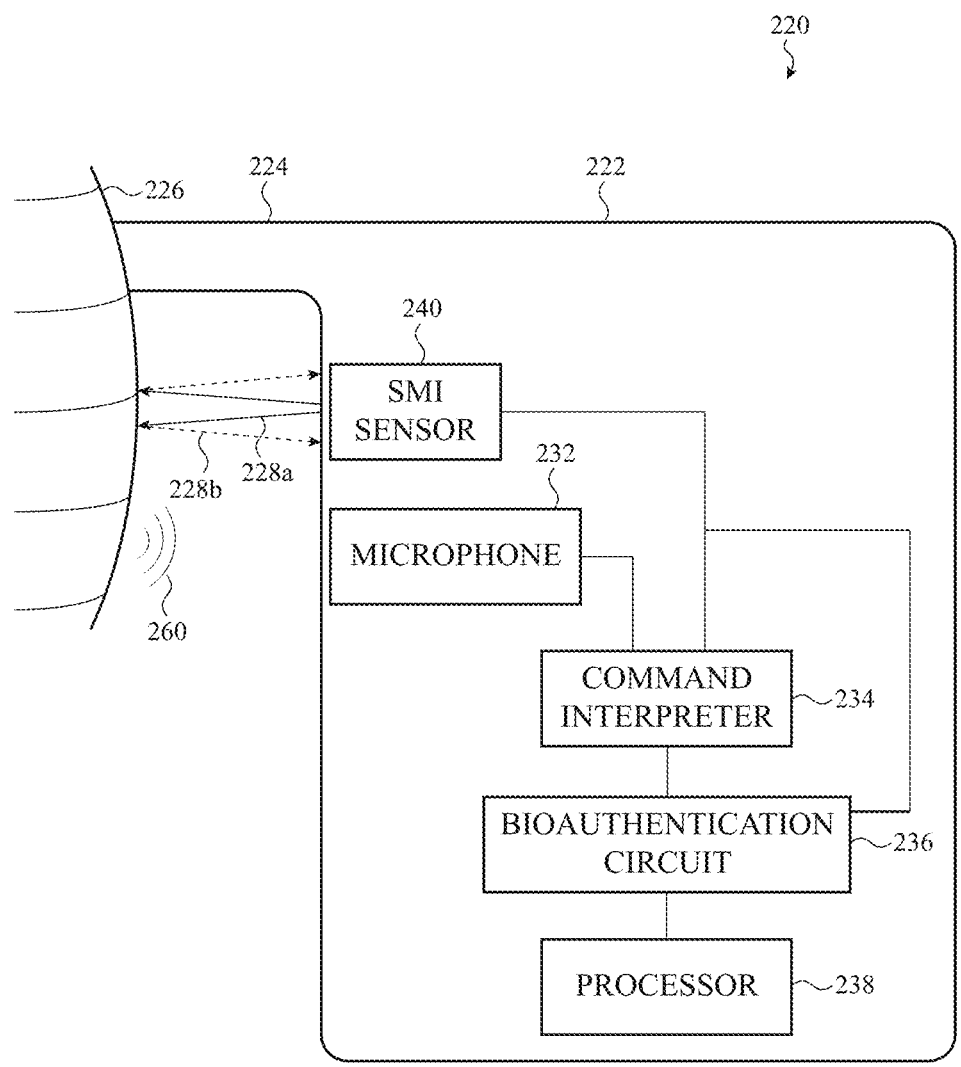
FIG. 2B illustrates a block diagram of the components of another wearable device, in relation to part of a user's head, according to an embodiment.
Figure 2C:
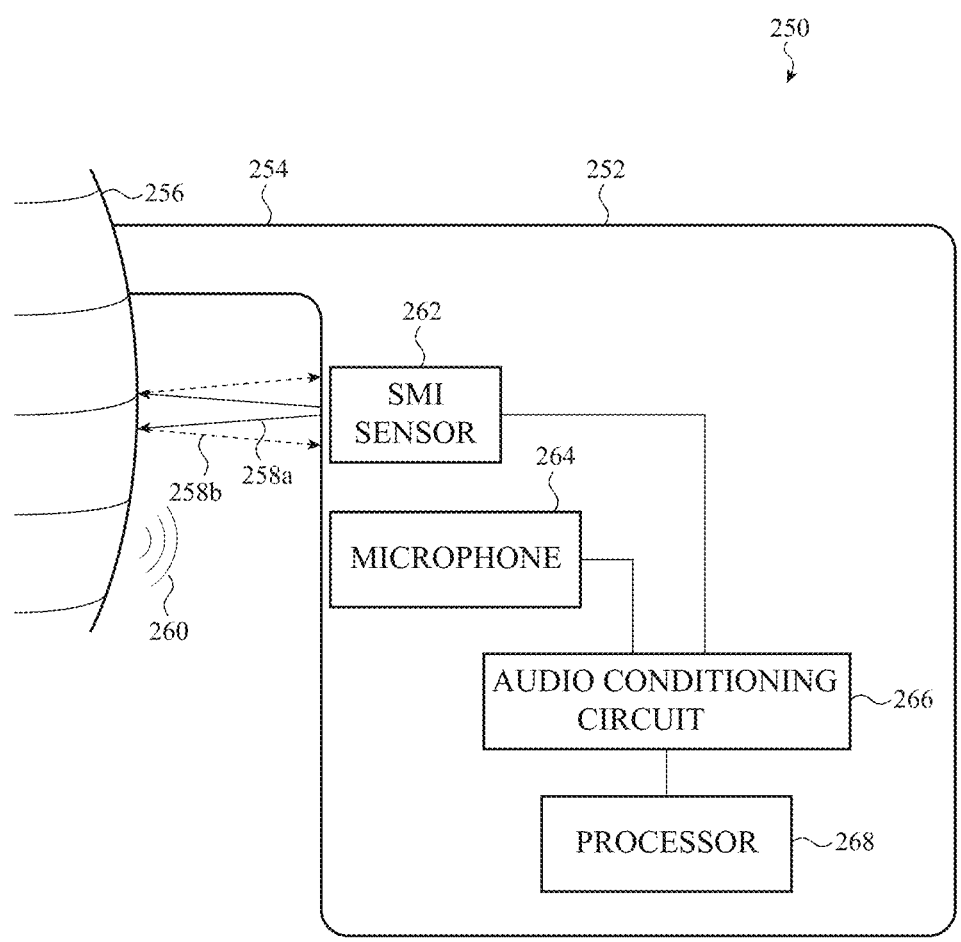
FIG. 2C illustrates a block diagram of the components of a third wearable device, in relation to part of a user's head, according to an embodiment.

FIGS. 2A-C show various block diagrams of configurations for wearable electronic devices. The configurations shown in the block diagrams are representational only, and do not imply any information regarding dimensions or shape of the features shown.

FIG. 2A is a block diagram of a configuration 200 by which a wearable electronic device 202 may have an attachment 204 to a part of a user's head 206 in order to receive inputs from the user by detecting skin deformations. The skin deformations may be caused by the user audibly or inaudibly making a voiced command or a silent gesture, or by another cause related to a user input to the wearable electronic device.

The device 202 may include a self-mixing interferometry (SMI) sensor 210 that emits an outgoing beam of light 208a toward a location on the user's head 206, and receives reflections 208b of the outgoing beam of light 208a. The reflections 208b may cause self-mixing interference in a light source, such as a laser diode, of the SMI sensor 210. The self-mixing interference may be observed in a self-mixing interferometry signal, and may be associated or correlated with motion of the user's head 206.

The device 202 may include a command interpreter 212, that may analyze the self-mixing interferometry signal, such as by the methods described below in relation to FIGS. 7A-10. The command interpreter 212 may include processors and/or other processing circuits to detect skin deformation information, such as distance, displacement, motion or velocity of the skin at the location on the user's head 206. From the skin deformation information, the command interpreter 212 may be able to recognize a command of the user, whether it be voiced or a silent gesture.

The command interpreter 212 may send instructions or other signals to affect the state of the device 202, or of an associated device. For example, in the case that the device 202 is an earbud speaker/microphone combination, the instructions may cause the device 202 to reduce a volume produced by the speaker, or may instruct a cellphone linked with the earbud to dial a person.

FIG. 2B shows a block diagram of an additional and/or alternative configuration 220 that may extend the configuration 200 of FIG. 2A. The configuration 220 includes a wearable device 222 that can attach to a user's head 226 by means of a connection component 224. Particular devices making use of the configuration 200 will be described below, with two exemplary devices shown in FIGS. 3A-B. As in the configuration 200 of FIG. 2A, the device 222 includes a self-mixing interferometry (SMI) sensor 240, as described above, configured to emit a beam of light 228a toward a location on the user's head 226, and receive reflections 228b from the location that may cause a light source in the SMI sensor 240 to undergo self-mixing interference. The self-mixing interference may be detected in a self-mixing interferometry signal of the self-mixing interferometry sensor 240.

The device 222 further includes a microphone 232 configured to receive sound input 230. The sound input 230 may be a voiced command of the user, or originate from another sound source, such as another person, a music source, or from background noise. The microphone 232 may perform an initial filtering or signal conditioning on the received sound input 230, and may produce a corresponding output signal having an alternate format, such as a digital encoded format. The microphone 232 allows the device 222 to use sensor fusion, in which both the output signal of the microphone 232 and the self-mixing interferometry signal from the SMI sensor 240 are both used to detect a user input.

The device 222 includes a command interpreter 234 configured to receive a signal output from the microphone 232 and associated with the sound input 230. The command interpreter 234 may optionally receive a self-mixing interferometry signal from the SMI sensor 240. The command interpreter 234 may analyze the microphone's sound signal and apply a voice recognition algorithm to decide if the sound input 230 originated from a person's voice, such as the user's voice. The command interpreter 234 may also make a decision about the content in the sound input 230, and determine if they represent a voiced command.

The command interpreter 234 may optionally be configured to analyze the self-mixing interferometry signal from the SMI sensor 240 to determine if the user was speaking during the time interval in which the sound input 230 was received. The command interpreter 234 may also make a decision, based on skin deformation information in the self-mixing interferometry signal, about whether the user made either a voiced command or a silent gesture command during the time interval when the microphone received the sound input 230.

The device 222 further includes a bioauthentication circuit 236 configured to authenticate whether a voiced command or a silent gesture command arose from the user. The bioauthentication circuit 236 may be part of, or work in conjunction with, a processor 238 included in the device 222.

One such authentication may be to accept a voiced command recognized in the microphone's output signal only if the analysis of the self-mixing interferometry signal confirms that the user was speaking when the microphone received the sound input 230. In another type of authentication, a voiced command recognized in the microphone's output signal is accepted only when it agrees with a voiced command recognized in skin deformation information of the self-mixing interferometry signal. These two types of authentication can reduce improper command entry to the device 222, such as from a recording of the user's voice, or from another person's voice.

In still another authentication, a silent gesture command recognized in skin deformation information of the self-mixing interferometry signal may be accepted as valid if the sound input 230 occurring concurrently with the skin deformation is below a volume threshold, such as when the user is not speaking and the background noise is low.

The bioauthentication circuit 236, and/or its associated processor 238, may store voice patterns from the user for recognizing and/or authenticating voiced commands. The voice patterns of the user may have been entered into the device 222 during an initial training session, or may be obtained during usage of the device 222 by use of learning algorithms. A voice signal recognized in the microphone's output signal may only be accepted as a valid input command to the device 222 when it is found to match a stored voice pattern of the user.

FIG. 2C shows a block diagram of an additional and/or alternative configuration 250 that may extend the configuration 200 of FIG. 2A or 2B. The configuration 250 includes a wearable device 252 that can attach to a user's head 256 by means of a connection component 254. Particular devices that may make use of the configuration 250 will be described below, with two examples shown in FIGS. 3A-B. As in the configuration 200 of FIG. 2A, the device 252 includes a self-mixing interferometry (SMI) sensor 262, as described above, configured to emit a beam of light 258a toward a location on the user's head 256, and receive reflections 258b from the location. The reflections 258b may cause a light source in the SMI sensor 262 to undergo self-mixing interference. The self-mixing interference may be detected in a self-mixing interferometry signal of the SMI sensor 262.

As with the device 222, the device 252 includes a microphone 264 operable to detect sound input 260, which may be a voiced command of the user, or originate from another sound source, such as another person, a music source, or from background noise. The microphone 264 may perform an initial filtering or signal conditioning on the received sound input 260, and may produce a corresponding output signal having an alternate format, such as a digital encoded format. The microphone 264 allows the device 252 to use sensor fusion, in which both an output signal of the microphone 264 and the self-mixing interferometry signal from the SMI sensor 262 are both used to detect a user input.

The device 252 includes an audio conditioning circuit 266 configured to receive both the output signal of the microphone 264 and the self-mixing interferometry signal from the SMI sensor 262. The audio conditioning circuit 266 may be part of the processor 268, or may work in conjunction with the processor 268 to analyze the output signal of the microphone 264 and the self-mixing interferometry signal from the SMI sensor 262. The audio conditioning circuit 266 may perform bioauthentication operations, such any of those described above.

The audio conditioning circuit 266 may be configured to perform various operations using the combination of the self-mixing interferometry signal and the output signal of the microphone 264. In one such operation, the audio conditioning circuit 266 and/or its associated processor 268 may have stored various voiced commands of the user. The audio conditioning circuit 266 may use the self-mixing interferometry signal and a concurrently received output signal to determine an intended voiced command from among the stored voiced commands of the user. The matched voiced command may then be transmitted by the audio conditioning circuit 266 and/or its associated processor 268 to an electronic device associated with the device 252. For example, the device 252 may be the earbud 300 described below, and may be linked by a Bluetooth connection with a cellphone. By transmitting the matched voiced command, noise in the received sound input 260 would not be further transmitted.

In a second operation, the audio conditioning circuit 266 may determine that the output signal from the microphone 264 is below an amplitude or volume threshold. However, the audio conditioning circuit 266 may detect that the user was making a silent gesture command based on the self-mixing interferometry signal. The silent gesture command may be matched with a stored voiced command of the user, and that stored voiced command may be transmitted to an associated electronic device. For example, the device 252 may be the earbud 300 below. A user may inaudibly form words with jaw motions, such the words or numbers of a passcode, to maintain privacy. While only background noise may be detected by the microphone 264 in the sound input 260, the audio conditioning circuit 266 may detect the formed words in the skin deformation information in the self-mixing interferometry signal. Then the stored voiced command may be transmitted to a cellphone linked with the earbud.

In a third operation, the audio conditioning circuit 266 may use signal processing algorithms, such as weighted averaging, applied to a concurrently received sound input 260 and a self-mixing interferometry signal. The signal processing may remove noise, strengthen or interpolate for inaudible sections in the received sound input 260, or perform other operations.

The audio conditioning circuit 266 may perform other or alternative operations in addition to or instead of the operations described.

Details of four specific examples of wearable devices that may implement the configurations described above are now presented, along with further processes or operations they may perform. However, it is to be understood that other wearable devices are within the scope of this disclosure.

Figure 3A:
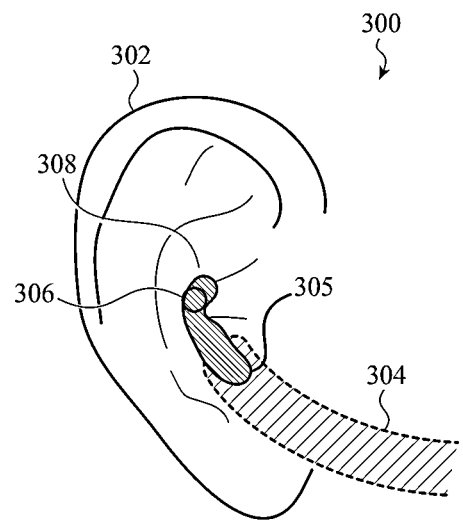
FIG. 3A illustrates an ear bud that may use skin deformation or skin vibration detection, according to an embodiment.
Figure 3B:
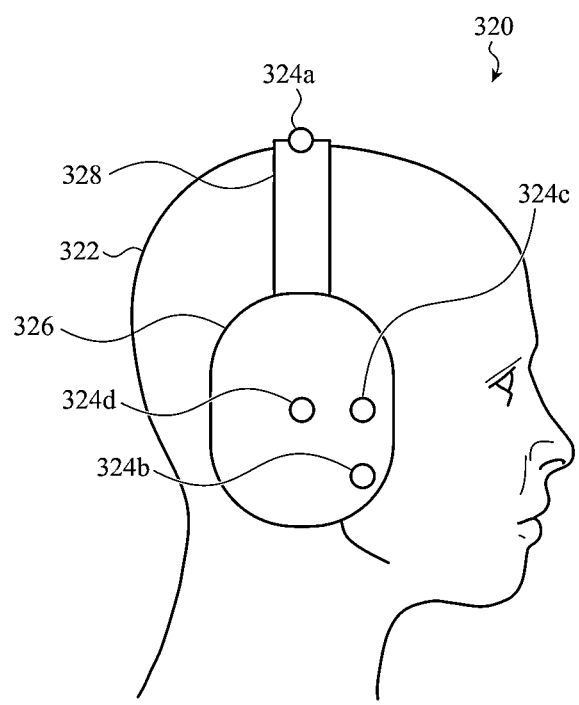
FIG. 3B illustrates a headphone apparatus with a component for detecting skin deformation, or skin vibration or movement, according to an embodiment.

FIGS. 3A-B show two exemplary wearable electronic devices that may be configured to detect and receive user inputs or commands. The user inputs may be voiced commands or silent gestures.

FIG. 3A illustrates a wearable earbud device (or just "earbud") 300 positioned within a user's ear 302. The earbud 300 may include a microphone 304 contained in a tubular housing extending from the user's ear toward the user's mouth (along a portion of the user's face). The microphone 304 may use any sufficiently compact technology, such as a piezoelectric or other technology, to be contained within an earbud and be operable to detect and receive voice and audio sounds. The earbud 300 may include a middle section 305 configured to lodge in the opening of the user's ear canal. The middle section 305 may include an in-ear speaker configured to direct sound into a user's ear canal. The middle section 305 may also include a radio transmitter/receiver operable to transmit voice or audio signals to another device, such as the user's cellphone. The radio transmitter/receiver may also receive electromagnetic signals (such as Bluetooth or another radio frequency transmission technology) modulated to carry voice or audio signals, and cause the in-ear speaker to produce such voice or audio signals.

The earbud 300 may also contain a self-mixing interferometry sensor 306 configured so that when the earbud 300 is worn, the self-mixing interferometry sensor 306 is positioned to direct a beam of light toward a location 308 in the ear of the user. In some embodiments, the location 308 is such that there is minimal tissue between the self-mixing interferometry sensor and the user's skull. The positioning of the self-mixing interferometry sensor 306 on the earbud 300 may be adjustable by the user to improve detection by the self-mixing interferometry sensor 306 of skin deformation, which may include skin vibrations.

In such embodiments, when a user speaks, voice-induced vibrations may occur in the skull of the user, which may cause corresponding skin vibrations at the location 308. Skin vibrations may be detected at location 308 by the self-mixing interferometry sensor 306 based on self-mixing interference, induced by the skin vibrations, in a beam of light emitted by the self-mixing interferometry sensor 306.

As the skin vibrations at the location 308 may include vibrations induced by other sources than the user's speech, the detected skin vibrations may be analyzed by a processing circuitry (not shown) in the earbud 300 to detect information in the skin vibrations that are induced by the user's speech. Such an analysis may include comparisons of the skin vibrations to one or more voice patterns or stored voiced commands of the user. Such voice patterns may include those of common voiced commands.

The earbud 300 may implement any of the bioauthentication operations described above. The earbud 300 may additionally and/or alternatively implement any of the audio conditioning operations described above. The middle section 305 may include such electronic circuits as needed to perform such operations, and may contain a battery to supply power to the microphone 304 and such other electronic circuits.

FIG. 3B shows a second embodiment of a wearable device 320 that may use self-mixing interferometry sensors as part of detecting user inputs. The wearable device 320 is a headphone device 320 that may fit on a user's head 322. The headphone device 320 includes at least one over-ear speaker cup 326. The headphone device 320 is attached to the user's head 322 by a flexible band 328.

The headphone device 320 may include multiple self-mixing interferometry sensors 324a-d to detect skin deformations at multiple locations on the user's head 322. Multiple self-mixing interferometry sensors may allow for correlation of their respective self-mixing interferometry signals during a user's voiced commands or silent gesture commands. The particular configuration of the self-mixing interferometry sensors 324a-d is exemplary, and is not to be construed as limiting.

The flexible band 328 includes the self-mixing interferometry sensor 324a, and is configured to direct a light beam emitted by the self-mixing interferometry sensor 324a toward a portion of the scalp or skin of the user 322 that is proximate to the parietal bone of the skull of the user 322. Audible speech by the user 322 may cause vibrations in the user's skull that travel to the parietal bone, which may in turn induce skin vibrations at the location at which the self-mixing interferometry sensor 324a directs its beam of light.

The self-mixing interferometry sensor 324b may be located in the over-ear speaker cup 326 and be positioned so that its emitted beam of light is directed to skin proximate to the temporomandibular joint (TMJ). The user 322 may use jaw and tongue motions to form speech, either audibly by exhaling, or inaudibly by not exhaling, during the jaw and tongue motions. In either case, a corresponding motion at the TMJ can cause a skin deformation that can be detected by the self-mixing interferometry sensor 324b. Thus the signal of self-mixing interferometry sensor 324b may be used in detection of both or either of voiced commands and silent gesture user inputs. Further, a user's particular jaw motions that are not related to a speech or human sound may be used as a source of inputs. For example, jaw motions to the right or left, or up or down, may be detectable and interpretable as specific inputs.

The self-mixing interferometry sensor 324c may be located in the over-ear speaker cup 326 and be positioned so that its emitted beam of light is directed to skin proximate to the temporal bone of the user 322. Audible speech by the user 322 may cause vibrations in the user's skull that travel to the temporal bone, which may in turn induce skin vibrations at the location at which the self-mixing interferometry sensor 324c directs its beam of light.

The self-mixing interferometry sensor 324d may be located in the over-ear speaker cup 326, and may be positioned so that its emitted beam of light is directed to a location in the ear of the user 322, such as the location 308 in the ear described above in relation to the earbud 300. As described above, audible speech by a user may induce skin vibrations at that location which may be detected by the self-mixing interferometry sensor 324d.

The headphone device 320 may make use of any combination of self-mixing interferometry signals of the self-mixing interferometry sensors 324a-d. The headphone device 320 may contain a command interpreter and at least one of a bioauthentication circuit and an audio conditioning circuit, as described previously.

Though only the right side over-ear speaker cup 326 is described, one skilled in the art will recognize that the headphone device 320 may include a similar over-ear speaker cup for the user's left side. The left side over-ear speaker cup may have the same, more, or fewer self-mixing interferometry sensors than the four shown for the right side over-ear speaker cup 326. Also, one skilled in the art will also recognize the right side over-ear speaker cup 326 may itself have more or fewer than the four self-mixing interferometry sensors 324a-d shown and described.

The headphone device 320 may detect the user's voiced commands from skin deformation information in the signals of the four self-mixing interferometry sensors 324a-d. The headphone device 320 may contain transmitter circuitry that allows the headphone device 320 to send the voiced commands to another device. Thus the headphone device may not need to include a dedicated microphone.

A third embodiment of a wearable device that may use self-mixing interferometry sensors as part of detecting user inputs is an eyeglass frame. A self-mixing interferometry sensor may be located on an arm of the eyeglass frame and be positioned to emit its beam of light toward a location on a user's head proximate to the temporal bone. As already described, audible speech by the user may induce skin vibrations at the location that may be detectable by the self-mixing interferometry sensor.

As described above, information in the detected skin vibration may be used by a command interpreter to determine a voiced command user input. The self-mixing interferometry sensor may be part of a configuration that includes a command interpreter and a transmitting circuit, such as in the configurations described in relation to FIGS. 2A-C. The eyeglass frame may also include at least one of a bioauthentication circuit and an audio conditioning circuit, as previously described.

In a variation of this third embodiment, the eyeglass frame may include a self-mixing interferometry sensor located on the bridge connecting the two lenses, and positioned to direct its light toward the location on the skin over the frontal bone of the user. Voiced speech by the user may cause skin vibrations at the location that may be detected by the self-mixing interferometry sensor. The self-mixing interferometry sensor on the bridge may be in lieu of the self-mixing interferometry sensor on the arm, or in addition to it.

A fourth embodiment of a wearable device that may use self-mixing interferometry sensors as part of detecting user inputs, such as voiced commands or silent gesture user inputs, is an augmented reality/virtual reality (AR/VR)

headset. Such an AR/VR headset may include visual display goggles positioned in front of the user's eyes. The AR/VR headset may include one or two over-ear speaker cups, as shown in FIG. 3B, to provide voice and audio input the user. Alternatively, the AR/VR headset may include an earbud component, such as the earbud 300 of FIG. 3A to provide voice and audio input to the user.

The AR/VR headset may include multiple self-mixing interferometry sensors. One self-mixing interferometry sensor may be positioned on the visual display goggles to direct its beam of light toward the skin of the user's head overlying the frontal bone.

Another self-mixing interferometry sensor may be located in a flexible strap that extends over the top of the user's head, and be positioned to direct its beam of light toward a location on the user's head proximate to the parietal bone. For example, this self-mixing interferometry sensor may be positioned as shown for self-mixing interferometry sensor 324a in FIG. 3B.

The AR/VR headset may have a flexible strap that extends horizontally around the user's head and attaches to the visual display goggles. Another self-mixing interferometry sensor may be positioned on such a horizontal flexible strap so that its beam of light is directed toward a location on the user's head proximate to the temporal bone.

In embodiments of AR/VR headsets that use earbuds similar to earbud device 300 for voice and audio input to the user, the earbud may include a self-mixing interferometry sensor similarly positioned and operable as the self-mixing interferometry sensor 306 in FIG. 3A. The earbud may also be equipped with a microphone, such as microphone 304 of FIG. 3A.

In embodiments of AR/VR headsets that use at least one over-ear speaker cup similar to over-ear speaker cup 326, the over-ear speaker cup may include self-mixing interferometry sensors similarly positioned and operable as self-mixing interferometry sensors 324b-d. The over-ear speaker cup may have more or fewer than three self-mixing interferometry sensors.

The self-mixing interferometry sensors of the various embodiments may make use of laser diodes to produce laser light as the emitted beam of light. The reflections of the beam of light may induce self-mixing interference in the lasing cavity. The self-mixing interferometry signal arising from the self-mixing interference may be of an electrical or optical parameter of the laser diode itself, or may be of a photodiode (PD) associated with, or part of, the laser diode. Specific details about, and configurations of, vertical cavity, surface emitting laser (VCSEL) diodes will be presented below in relation to FIGS. 4A-D. However, other types of laser diodes may be used in a self-mixing interferometry sensor, such as edge emitting lasers, quantum cascade lasers, quantum dot lasers, or another type. While the exemplary embodiments for detecting user input are described below as including both laser diodes and associated PDs, other embodiments may not include an PD. In such other embodiments, the measured interferometric parameter used to determine distance or displacement may be a parameter of the laser diode itself, such as a junction voltage or current, a power level, or another parameter.

FIGS. 4A-D show exemplary configurations or structures of VCSEL diodes and associated photodetectors (PDs) that may be included in the self-mixing interferometry sensors of various embodiments of wearable devices. Such self-mixing interferometry sensors may be used as the source of the beam of light emitted by a self-mixing interferometry sensor in a wearable electronic device, such as the four particular embodiments of wearable devices described above. These configurations are exemplary, and should not be construed as limiting.

Figure 4A:
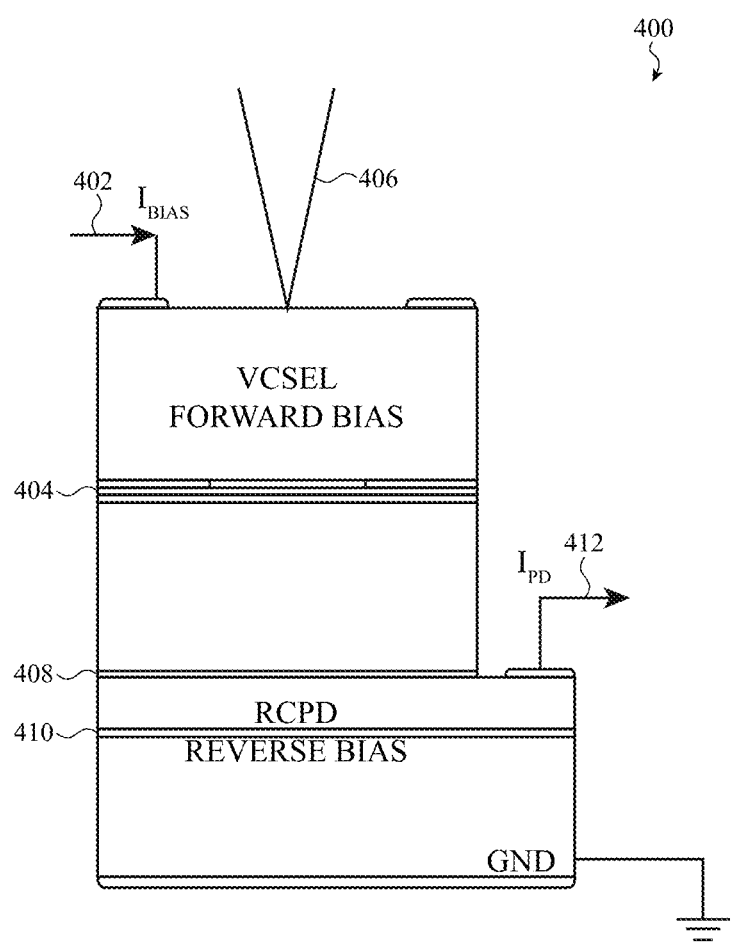
FIG. 4A illustrates a VCSEL diode with an integrated intra-cavity photodetector, according to an embodiment.

FIG. 4A shows a structure 400 for a VCSEL diode with an intrinsic (or "integrated") intra-cavity PD. The structure 400 can be formed in a single semiconductor wafer, and includes a VCSEL diode having an active gain region 404. At forward bias, a bias current 402 $I_{BIAS}$ flows through the VCSEL diode to cause it to emit laser light 406 from its top surface. A photodetector 410 can be embedded in the bottom distributed Bragg reflector mirror of the VCSEL diode to detect the laser light, including laser light that has undergone self-mixing interference (SMI). The photodetector (PD) 410 may be implemented as a resonant cavity photodetector (RCPD) with a resonance wavelength that is matched to the emission wavelength of the laser. There may be an etch stop layer 408 forming a boundary between the VCSEL diode lasing cavity and the PD 410. During emission of laser light 406, in the case that the PD 410 is a resonant cavity photodetector, the PD 410 is reversed biased so that a photodetector current 412 $I_{PD}$ flows from the resonant cavity PD 410.

During emission of the laser light 406, SMI may occur due to reception in the cavity of reflections of the laser light 406. The SMI may cause variations in the photodetector current 412 $I_{PD}$ that correlate with distance or displacement to the location on a user's head at which the reflections arise.

Figure 4B:
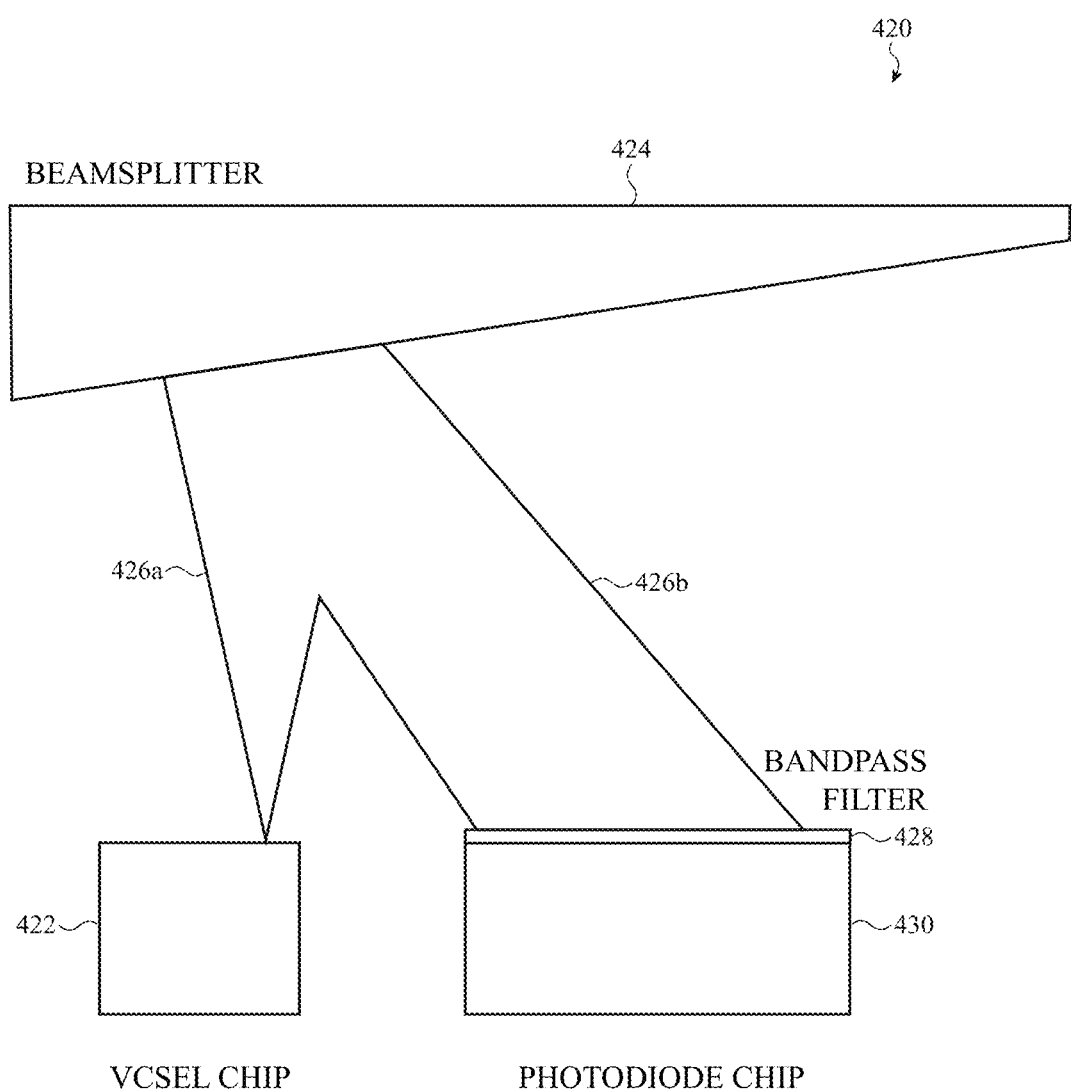
FIG. 4B illustrates a VCSEL diode associated with a separate photodetector, according to an embodiment.

FIG. 4B shows a structure 420 for part of a self-mixing interferometry sensor in which VCSEL diode 422 is used in conjunction with an extrinsic PD 430 located on a separate chip within a self-mixing interferometry sensor. The VCSEL diode 422 emits a beam of laser light 426a. The emitted beam of laser light 426a may traverse a beam splitter and be directed by components of a focusing system toward location on the user's head. Reflections of the emitted beam of laser light 426a from the location may be received back into the VCSEL diode 422 and cause SMI. The SMI alters a property of the emitted beam of laser light 426a, such as the optical power, to a new steady state value.

Some of the altered beam of emitted beam of laser light 426a is diverted by the beam splitter 424 to become the diverted beam of laser light 426b that is received by the PD 430. The distance between the VCSEL diode 422 and the beam splitter 424 may be on the order of 100 to 250 µm, though this is not required. The PD 430 may include a bandpass filter 428 to eliminate light at wavelengths different from that of the diverted beam of laser light 426b. An interferometric parameter, such as current, of the PD 430 may be monitored, and variations therein used by other components or circuits of the self-mixing interferometry sensor to determine distances from the self-mixing interferometry sensor to a reflection source, such as a location on a head of a user of the wearable electronic device.

Figure 4C:
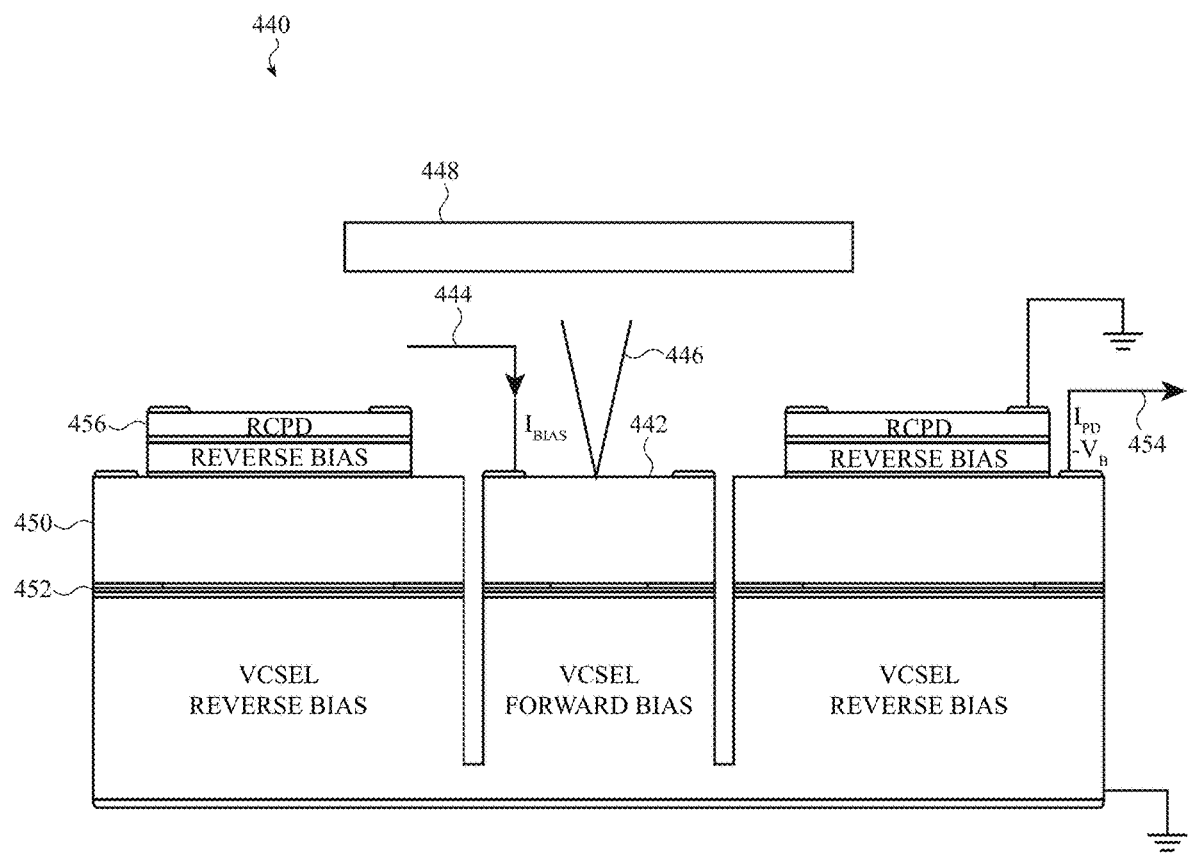
FIG. 4C illustrates a VCSEL diode with an extrinsic, on-chip photodetector, according to an embodiment.

FIG. 4C shows a structure 440 for part of a self-mixing interferometry sensor having VCSEL diode 442 and an extrinsic, on-chip PD 456. The PD 456 may be a RCPD as described above. The RCPD 456 may form an annular disk around the VCSEL diode 442. In the structure 440, the RCPD 456 may be positioned over associated reverse biased VCSEL diode 450 having a quantum wells at layer 452 in order to make the fabrication process easier. In other embodiments, reverse biased VCSELs may not exist and the RCPD could be in direct contact with the substrate on which the VCSEL is located.

In operation, the VCSEL diode 442 is forward biased so that it emits laser light beam 446, and bias current, $I_{BIAS}$, 444 flows through it. The associated VCSEL diode 450 is reverse biased to prevent it from lasing. The laser light beam 446 may be directed toward a location on the user's head. The laser beam of light may be reflected from the location on the user's head during the emission, and cause SMI in the VCSEL diode 442 that alters the optical power of the emitted laser light beam 446. Reflections of the altered emitted laser light beam 446 may be diverted by the beam splitter 448 and received by the RCPD 456. During emission of the laser light, the RCPD 456 is reverse biased and produces photodiode current, $I_{PD}$, 454. The photodiode current 454 is generated in response to the laser light 446 partially reflected from the beam splitter 448. The photodiode current 454 may vary due to the SMI and such variation may be used to determine distances to a reflection source, such as a location on a head of a user of the wearable electronic device.

Figure 4D:
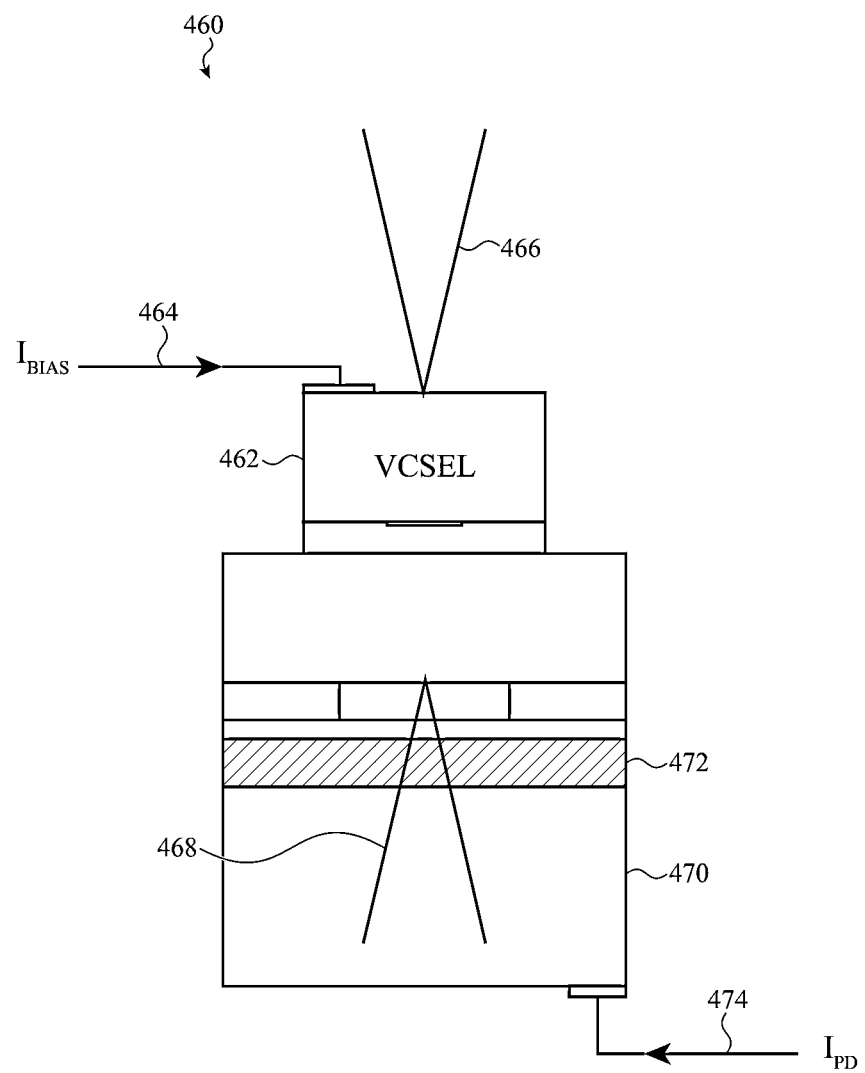
FIG. 4D illustrates a VCSEL diode with an extrinsic, off-chip photodetector, according to an embodiment.

FIG. 4D shows a structure 460 for part of a self-mixing interferometry sensor having dual emitting VCSEL diode 462 and an extrinsic, off-chip PD 470. During forward bias, a bias current, $I_{BIAS}$ 464, flows and the dual emitting VCSEL diode 462 emits a beam of laser light 466 from its top surface, which can be directed by components or circuits of a self-mixing interferometry sensor toward a location on a user's head during emission. The dual emitting VCSEL diode 462 also emits a second beam of laser light 468 from a bottom surface toward a PD 470. The dual emitting VCSEL diode 462 may be formed in a first semiconductor chip and joined to another chip in which the PD 470 is formed, with the joining such that the second beam of laser light 468 enters the PD 470. A connecting layer 472 between the two chips may allow the second beam of laser light 468 to be transmitted to the PD 470.

As in the previous structures, the first beam of laser light 466 may be reflected from the location on the user's head, with the reflections causing SMI in the VCSEL diode 462. The SMI may alter both the first beam of laser light 466 and the second beam of laser light 468. The alteration may cause a correlated change in an interferometric parameter of the structure 460, such as the photodetector current, $I_{PD}$, 474 in the PD 470. Distances or displacements to the location on the user's head may be determined using the correlated changes, such as described in relation to FIGS. 7A-10 below.

Figure 5:
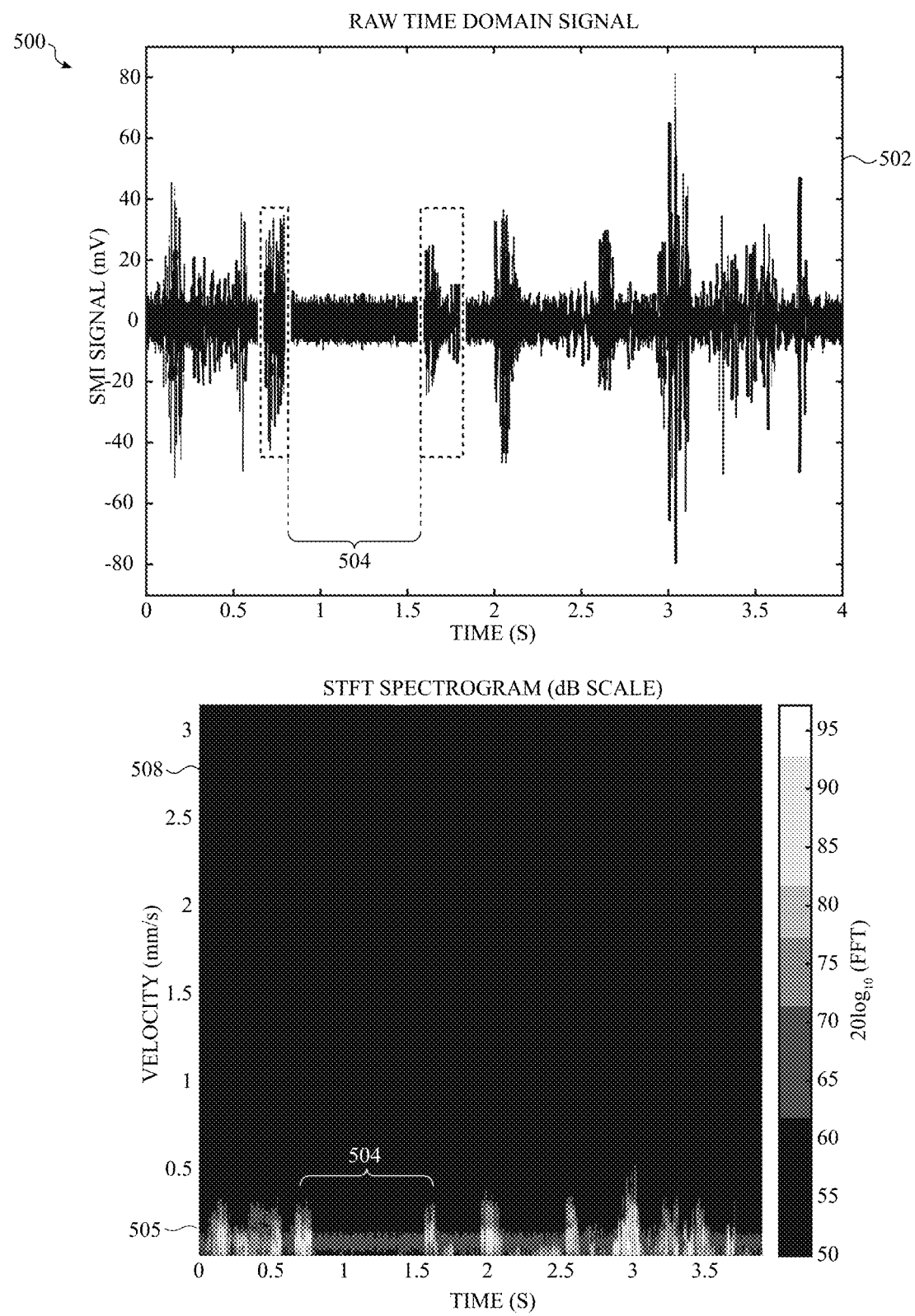
FIG. 5 shows time-correlated graphs of a self-mixing interferometry signal and a corresponding short-time Fourier transform during voiced speech, according to an embodiment.
Figure 6:
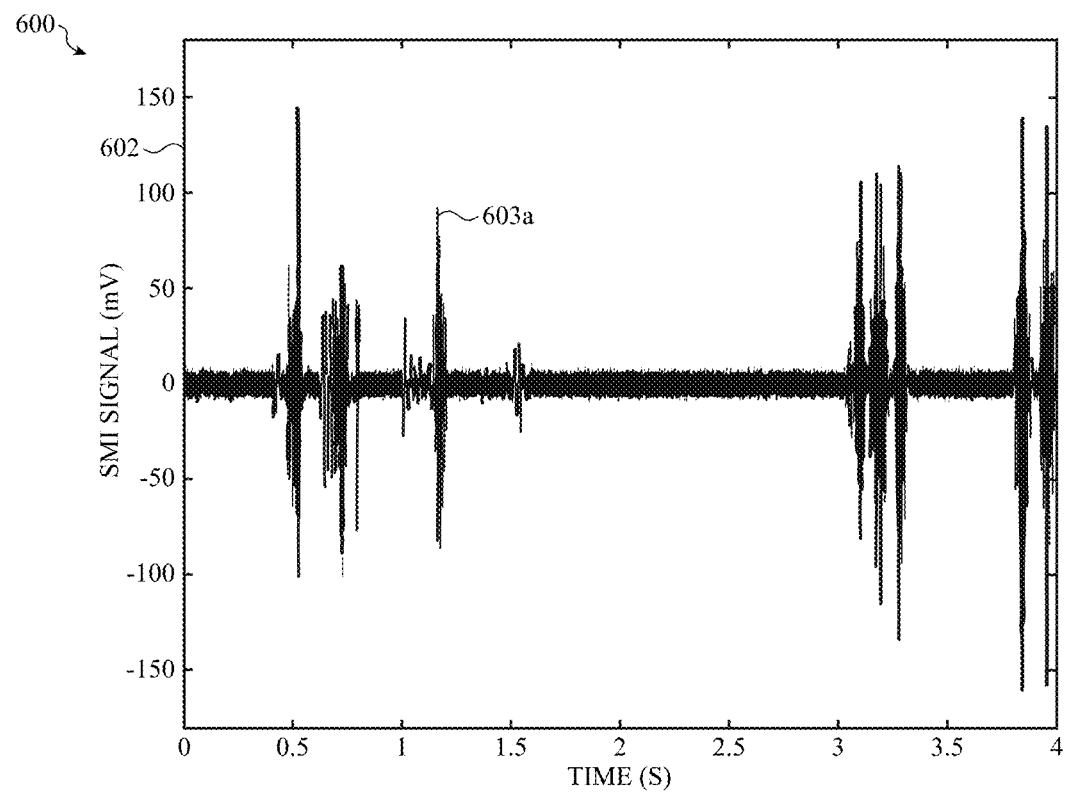
FIG. 6 shows time-correlated graphs of a self-mixing interferometry signal and a corresponding short-time Fourier transform during silent jaw motion, according to an embodiment.
Figure 6:
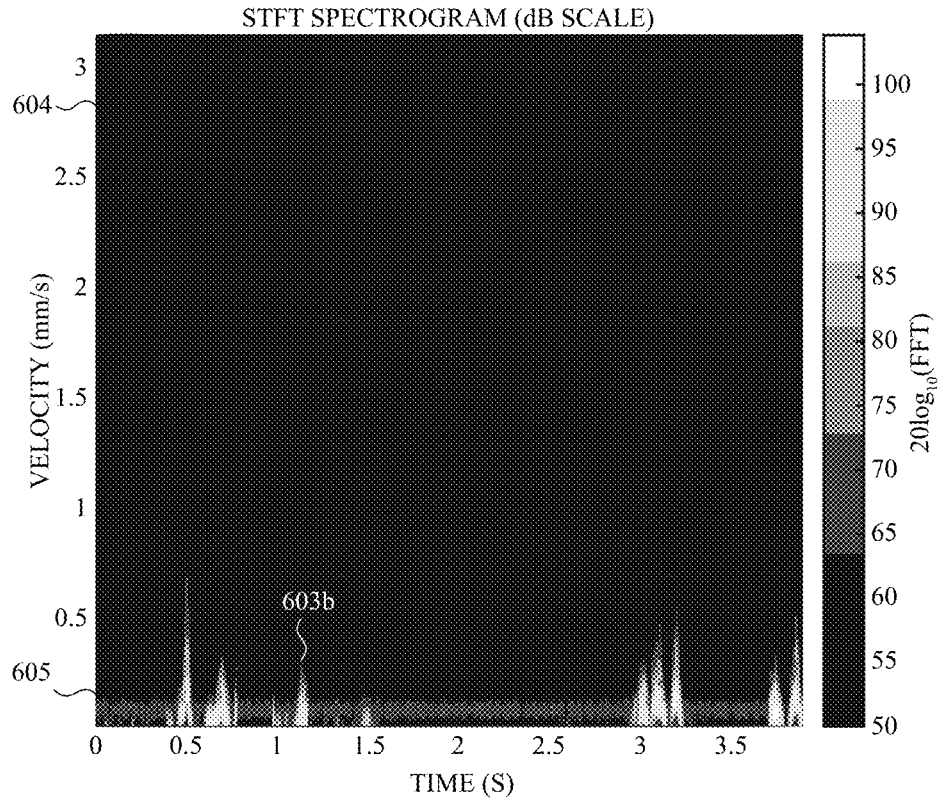

FIGS. 5 and 6 each show a pair of respective time-correlated graphs between a self-mixing interferometry signal and a corresponding short-time Fourier transform (STFT) of that signal. These figures illustrate how the wearable devices that make use of self-mixing interferometry sensors can detect time intervals during which the user is likely to be making a voiced command or a silent gesture input. Detecting such time intervals is useful in both bioauthentication operations and for audio conditioning operations, as described above.

FIG. 5 shows two exemplary time-correlated graphs 500 related to a self-mixing interferometry signal produced when a user is speaking. The top graph 502 shows an electronic output of the SMI signal itself, which may be photodetector output current or voltage, or an interferometric parameter of a laser diode, such as an optical power or bias current. The SMI signal includes voice pattern components that extend above approximately 10 mV. The SMI signal also includes a time interval 504 during which the user does not speak, so that the SMI signal only includes a background noise floor. On each side of the time interval 504 are representative speech events, shown in boxes.

The bottom graph 508 shows an amplitude plot of a short-time Fourier transform (STFT) of the SMI signal. During the time interval 504, the amplitude is below a noise threshold 505, whereas during the representative speech events the amplitude exceeds the noise threshold 505.

As described above in relation to FIGS. 2A-C, time intervals during which the user is speaking or silent are used in bioauthentication operations and audio conditioning operations. Such operations may thus apply a STFT to an SMI signal as part of determining that the user is giving a voiced command.

FIG. 6 shows two exemplary time-correlated graphs 600 related to a self-mixing interferometry signal produced by skin deformations due to jaw motion, such as at a TMJ. The top graph 602 shows an electronic output of the SMI signal itself, which may be photodetector output current or voltage, or an interferometric parameter of a laser diode, such as an optical power or bias current. The SMI signal includes pronounced spikes in amplitude at jaw motion events, such as jaw motion event 603a.

The bottom graph 604 shows an amplitude plot of a STFT of the SMI signal. During the jaw motion event 603a, the STFT shows a pronounced peak 603b that extends above a noise floor 605 so a user's jaw motion events may be distinguished from background noise. Bioauthentication and/or audio conditioning operations may apply a STFT to the SMI as part of determining silent gesture commands made by jaw motion of the user.

Figure 7A:
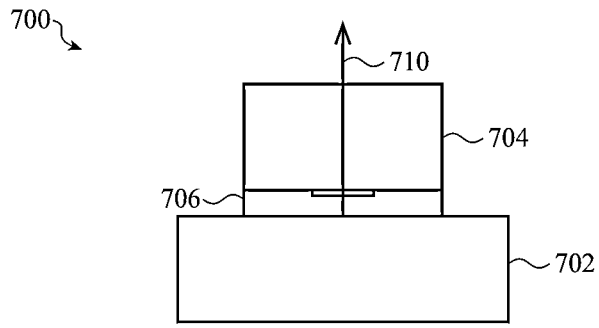
FIG. 7A illustrates a schematic for a self-mixing interferometry light source, according to an embodiment.
Figure 7B:
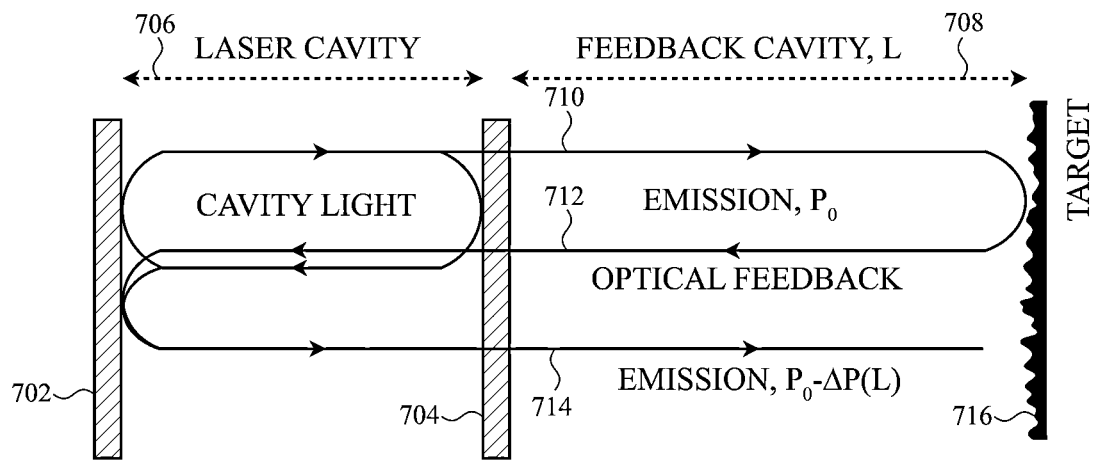
FIG. 7B illustrates self-mixing of laser light, according to an embodiment.
Figure 7C:
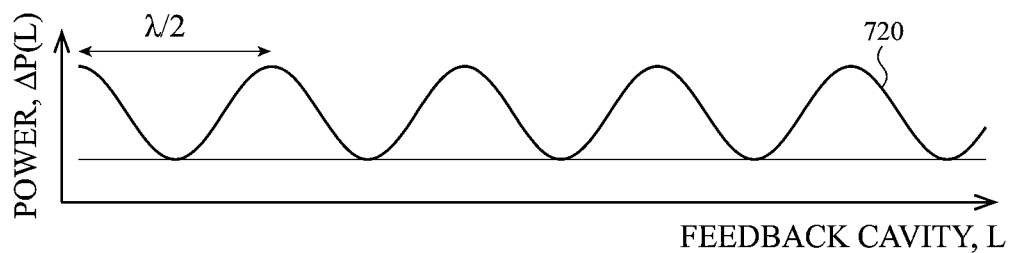
FIG. 7C illustrates a variation in an interferometric parameter due to self-mixing, according to an embodiment.

FIGS. 7A-C illustrate properties of self-mixing interference of coherent light emitted from a light source. The explanations are intended only to describe certain aspects of self-mixing interference needed to understand the disclosed embodiments. Other aspects of self-mixing interference will be clear to one skilled in the art.

FIG. 7A illustrates an exemplary configuration of a laser light source 700, specifically a VCSEL diode 700, that may be used as part of a self-mixing interferometry sensor. In any type of laser, an input energy source causes a gain material within a cavity to emit coherent light. Mirrors on ends of the cavity feed the light back into the gain material to cause amplification of the light and to cause the light to become coherent and (mostly) have a single wavelength. An aperture in one of the mirrors allows transmission of the laser light (e.g., transmission toward a location on the surface of a user's head).

In the VCSEL 700, there are two mirrors 702 and 704 on opposite ends of a cavity 706. The lasing occurs within the cavity 706. In the VCSEL diode 700, the two mirrors 702 and 704 may be implemented as distributed Bragg reflectors, which are alternating layers with high and low refractive indices. The cavity 706 contains a gain material, which may include multiple doped layers of III-V semiconductors. In one example, the gain material may include AlGaAs, InGaAs, and/or GaAs. The emitted laser light 710 can be emitted through the topmost layer or surface of VCSEL diode 700. In some VCSEL diodes, the coherent light is emitted through the bottom layer.

FIG. 7B shows a functional diagram of self-mixing interference (or also "optical feedback") with a laser. In FIG. 7B, the cavity 706 has been reoriented so that emitted laser light 710 is emitted from the cavity 706 to the right. The cavity 706 has a fixed length established at manufacture. The emitted laser light 710 travels away from the cavity 706 until it intersects or impinges on a target, which may be a location on a user's head, as in the embodiments described in relation to FIGS. 3A-B. The gap of distance L from the emission point through the mirror 704 of the emitted laser light 710 to the target is termed the feedback cavity 708. The length L of the feedback cavity 708 is variable as the target can move with respect to the VCSEL diode 700.

The emitted laser light 710 is reflected back into the cavity 706 by the target 716. The reflected light 712 enters the cavity 706 to coherently interact with the original emitted laser light 710. This results in a new steady state illustrated with the new emitted laser light 714. The emitted laser light 714 at the new steady state may have characteristics (e.g., a wavelength or power) that differ from what the emitted laser light 710 would have in the absence of reflection and self-mixing interference.

FIG. 7C is a graph 720 showing the variation in power of the combined emitted laser light 714 as a function of the length L of the feedback cavity 708, i.e., the distance from the emission point through the mirror 704 of the emitted laser light 710 to the target. The graph depicts a predominantly sinusoidal variation with a period of $\lambda/2$. Theoretical considerations imply that the variation is given by the proportionality relationship: $\Delta P \propto \cos(4\pi L/\lambda)$. This relationship generally holds in the absence of a strong specular reflection. In the case of such strong specular reflection, the cosine becomes distorted, i.e., higher harmonics are present in the relationship. However, the peak-to-peak separation stays at $\lambda/2$. For an initially stationary target, this relationship can be used to determine that a deflection has occurred. In conjunction with other techniques, such as counting of the completed number of periods, the range of the deflection may also be determined.

Though the graph 720 shows the variation in power of the combined emitted laser light 714 as a function of the length L of the feedback cavity 708, similar results and/or graphs may hold for other interferometric properties of a VCSEL diode or other type laser diode that are measured by a self-mixing interferometry sensor.

Measurements of one or more interferometric parameters by a self-mixing interferometry sensor can be used to infer distances and/or displacements of the target 716 from the VCSEL 700. These distance or displacement measurements can then be used to detect skin deformations or skin vibrations, as in the embodiments described above. A first family of embodiments uses a spectrum analysis of a signal of an interferometric parameter. A variation in the interferometric parameter is produced when an input signal (e.g., a bias current) of the laser diode is modulated with a triangle wave about a constant current value. The first family of embodiments is described in relation to FIGS. 8A-C.

A second family of embodiments uses time domain filtering and demodulation of a signal of an interferometric parameter. A variation in the interferometric parameter is produced when a bias current of the laser diode is modulated with a sine wave about a constant current value. The second family of embodiments is described in relation to FIGS. 9A-C and 10.

Figure 8A:
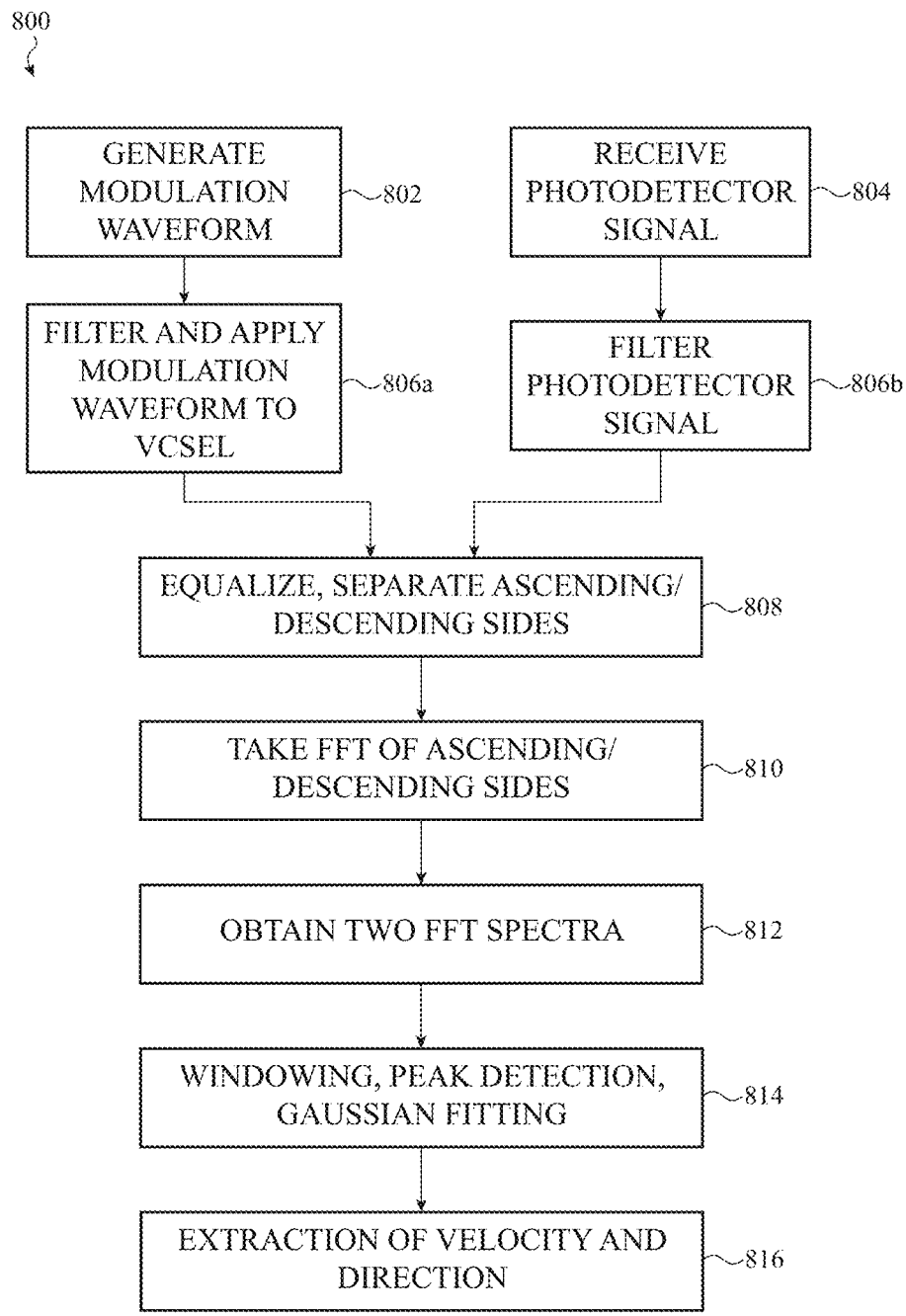
FIG. 8A is a flow chart of a spectrum analysis method for determining distances from a light source to an object using self-mixing interferometry, according to an embodiment.

In regard to the first family of embodiments, FIG. 8A is a flowchart of a spectrum analysis method 800 for determining distances from an self-mixing interferometry sensor to a location on a user's head. The spectrum analysis method 800 involves applying a triangle wave modulation to a bias current of a laser diode, and applying separate spectrum analyses to the signal of an interferometric parameter obtained during the rising time interval of the triangle wave modulation and to the signal of the interferometric parameter obtained during the falling time interval of the triangle wave modulation. The signal of the interferometric property may be an output signal of a photodetector, such as an output current or voltage, or it may be a signal of an interferometric parameter of the VCSEL itself.

Figure 8B:
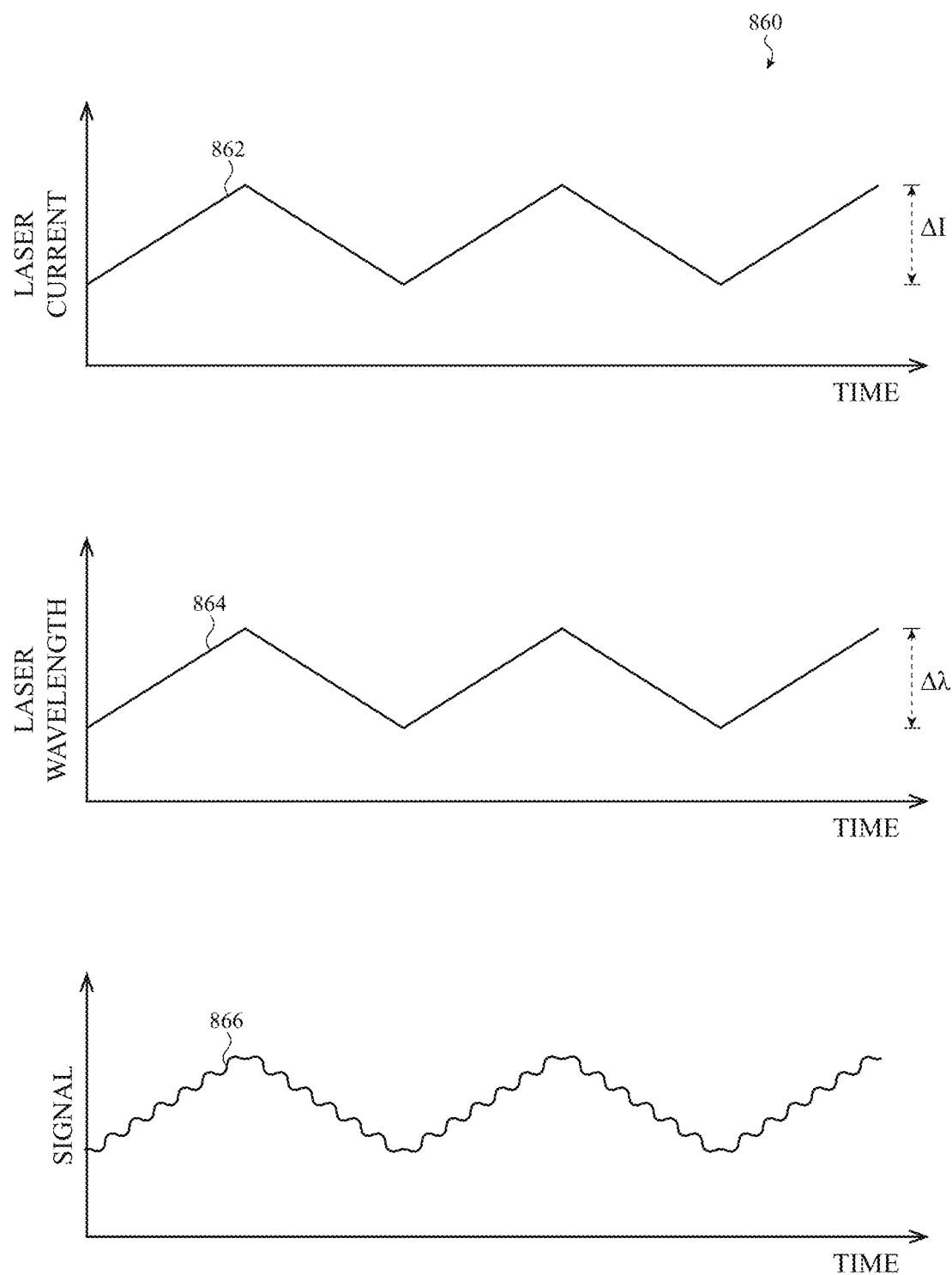
FIG. 8B shows time-correlated graphs of signals that may occur in a self-mixing interferometry sensor, according to an embodiment.

FIG. 8B shows three time correlated graphs 860 relating a triangle modulated laser bias current 862 with the resulting laser wavelength 864 and the resulting signal 866 of the measured interferometric parameter. The graphs 860 in FIG. 8B correspond to a stationary target. While the laser bias current 862 is shown with equal ascending and descending time intervals, in some embodiments these time intervals may have different durations. The spectrum analysis methods may make use of both the laser bias current 862 and the signal 866 of the measured interferometric parameter. In the case of a non-stationary target, the observed frequencies in the resulting signal 866 would differ during the rising and falling time intervals of the bias current 862. Distance and velocity can be obtained by a comparison of the two frequency values.

Returning to FIG. 8A, at stage 802 of the spectrum analysis method 800, an initial signal is generated, such as by a digital or an analog signal generator. At stage 806a the generated initial signal is processed as needed to produce the triangle modulated laser bias current 862 that is applied to the VCSEL. The operations of stage 806a can include, as needed, operations of digital-to-analog conversion (DAC) (such as when the initial signal is an output of a digital step generator), low-pass filtering (such as to remove quantization noise from the DAC), and voltage-to-current conversion.

The application of the triangle modulated laser bias current 862 to the VCSEL induces a signal 866 in the interferometric parameter. It will be assumed for simplicity of discussion that the signal 866 of the interferometric parameter is from a photodetector, but in other embodiments it may be another signal of an interferometric parameter from another component. At initial stage 804 of the spectrum analysis method 800, the signal 866 is received. At stage 806b, initial processing of the signal 866 is performed as needed. Stage 806b may include high-pass filtering.

At stage 808 the processing unit may equalize the received signals, if necessary. For example the signal 866 may include a predominant triangle waveform component matching the triangle modulated laser bias current 862, with a smaller and higher frequency component due to changes in the interferometric parameter. High-pass filtering may be applied to the signal 866 to obtain the component signal related to the interferometric parameter. Also, this stage may involve separating the parts of signal 866 and the triangle modulated laser bias current 862 corresponding to the ascending and to the descending time intervals of the triangle modulated laser bias current 862. The operations may include sampling the separated information.

At stages 808 and 810, a separate FFT is first performed on the parts of the processed form of signal 866 corresponding to the ascending and to the descending time intervals. Then the two FFT spectra are analyzed at stage 812.

At stage 814, further processing of the FFT spectra can be applied, such as to remove artifacts and reduce noise. Such further processing can include windowing, peak detection, and Gaussian fitting.

At stage 816, from the processed FFT spectra data, information regarding the skin deformation can be obtained, including an absolute distance, and/or a direction and velocity of the skin deformation or vibration at the location on the user's head. More specifically, the velocity is detected in the direction of the laser light.

Figure 8C:
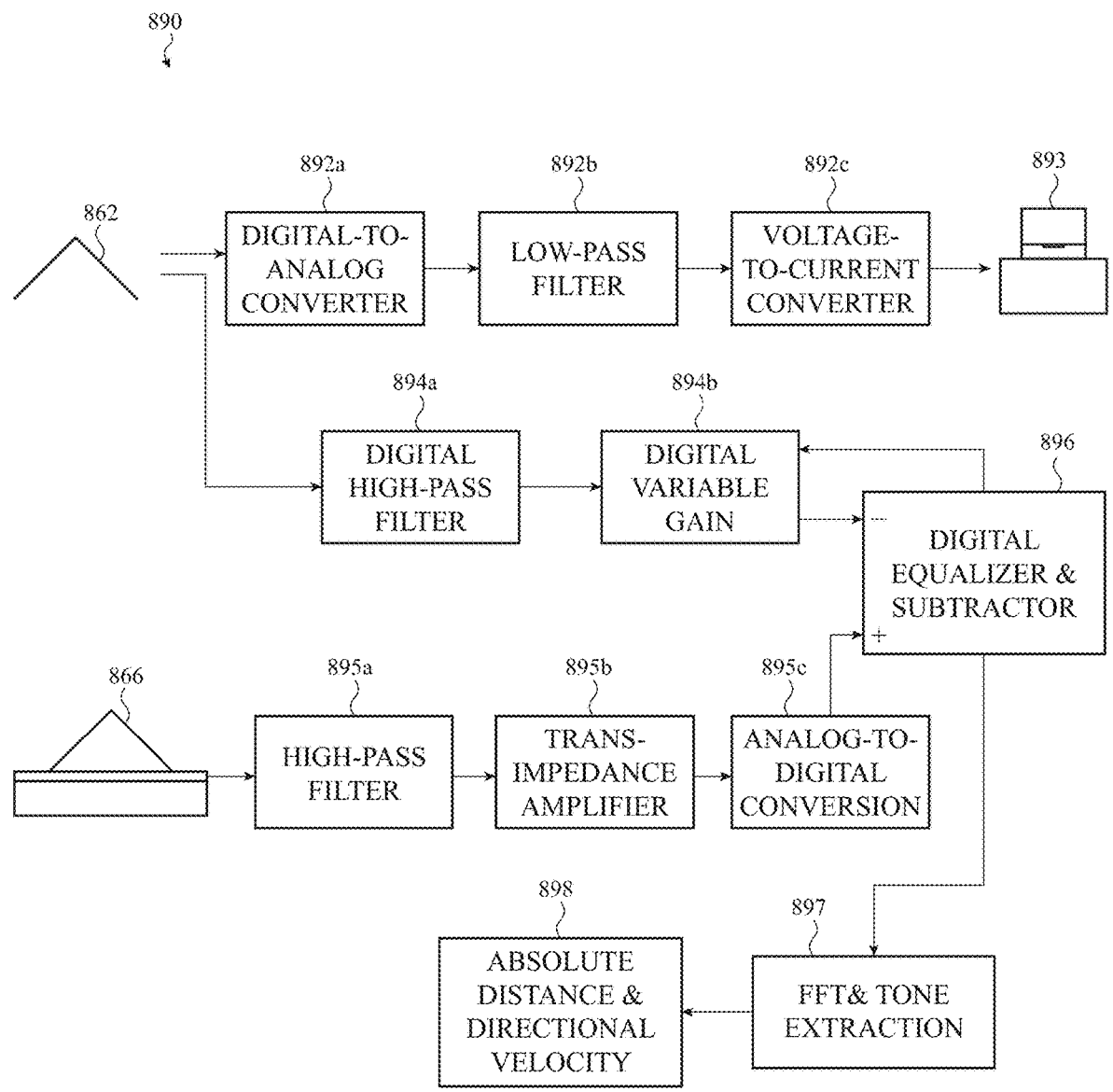
FIG. 8C illustrates a block diagram of a circuit operable to implement the spectrum analysis method for determining distances from a light source to an object using self-mixing interferometry, according to an embodiment.

FIG. 8C shows a block diagram of a system 890 that can implement the spectrum analysis just described in the spectrum analysis method 800. In the exemplary system 890 shown, the system 890 includes generating an initial digital signal and processing it as needed to produce a triangle modulated laser bias current 862 as an input to a bias current of a VCSEL diode 893. In an illustrative example, an initial step signal (not shown) may be produced by a digital generator to approximate a triangle function. The digital output values of the digital generator are used in the digital-to-analog (DAC) converter 892a. The resulting voltage signal may then be filtered by the low-pass filter 892b to remove quantization noise. Alternatively, an analog signal generator can be used to generate an equivalent triangle voltage signal directly. The filtered voltage signal then is an input to a voltage-to-current converter 892c to produce the desired triangle modulated laser bias current 862 in a form for input to the VCSEL diode 893.

As described above, reflections from the location on the user's head can cause SMI in the VCSEL diode 893 that alter an interferometric parameter of the VCSEL diode 893. This alteration in the interferometric parameter may be measured or inferred, either from a parameter of the VCSEL diode 893 itself or from a parameter of an associated photodetector. The changes can be measured to produce a signal 866. In the system 890 shown it will be assumed the signal 866 is measured by a photodetector. For the triangle modulated laser bias current 862, the signal 866 may be a triangle wave of similar period combined with a smaller and higher frequency signal related to the changes in the interferometric parameter.

The signal 866 is first passed into the high-pass filter 895a, which can effectively convert the major ascending and descending ramp components of the signal 866 to DC offsets. As the signal 866 from a photodetector may be a current signal, the transimpedance amplifier 895b can produce a corresponding voltage output for further processing.

The voltage output can then be sampled and quantized by the analog-to-digital conversion (ADC) block 895c. Before immediately applying a digital FFT to the output of the ADC block 895c, it can be helpful to apply equalization in order to clear remaining residue of the triangle signal received by the photodiode, and thus isolate the interferometric signal. The initial digital signal values from the digital generator used to produce the triangle modulated laser bias current 862 are used as input to the digital high pass filter 894a to produce a digital signal to correlate with the output of the ADC block 895c. An adjustable gain can be applied by the digital variable gain block 894b to the output of the digital high pass filter 894a.

The output of the digital variable gain block 894b is used as one input to the digital equalizer and subtractor block 896. The other input to the digital equalizer and subtractor block 896 is the output of the ADC block 895c. The two signals are differenced, and used as part of a feedback to adjust the gain provided by the digital variable gain block 894ba.

Once an optimal correlation is obtained by the feedback, an FFT, indicated by block 897, can then be applied to the components of the output of the ADC block 895c corresponding to the rising and descending of the triangle wave. From the FFT spectra obtained, movement of the location on the user's head can be inferred, as discussed above and indicated by block 898.

The second family of embodiments of devices and methods for recognizing a user input or command based on skin deformation or skin vibration directly obtains distance or displacement measurements from the signal of an interferometric parameter and using a time domain based analysis. This family is described in relation to FIGS. 9A-C and 10. The methods and devices make use of a sinusoidal modulation of a bias current of the laser diode and detects resulting effects in an interferometric parameter of a photodetector associated with the laser diode.

In this second family of embodiments, a laser light source, such any of the VCSELs described in FIGS. 4A-D, is used to direct laser light toward the location on the user's head. For simplicity of explanation only for this family of embodiments, the laser light source(s) will be assumed to be VCSEL(s). One skilled in the art will recognize how the embodiments may make use of other types of lasers or light sources that undergo self-mixing interference. In this second family of embodiments, there may be one or more photodetectors associated with each VCSEL, at least one of whose output parameters is correlated with a property of the self-mixing of the laser light that arises when some of the laser light emitted from the VCSEL diode is received back into the VCSEL diode after reflection from a target. In some embodiments, the photodetector is integrated as part of the VCSEL, such as in FIG. 4A. In other embodiments, the photodetector may be separate from the VCSEL, as in FIG. 4B. Instead of, or in addition to, an output of such a photodetector, some embodiments may measure another interferometric property of the VCSEL diode, such as a junction voltage.

The self-mixing interference effect contains at least two contributions: a first contribution from internal an electric field existing within the VCSEL diode and a second contribution from reflections from the target coupled back into the VCSEL diode, as indicated in FIG. 4B. The second contribution enters the laser cavity phase shifted from the first. The radian value of the phase shift can be expressed as $\Delta\varphi = 2\pi$ [2L mod $\lambda$], or equivalently as $$2\pi \left( \frac{2L}{\lambda} - \left\lfloor \frac{2L}{\lambda} \right\rfloor \right),$$

where $\lambda$ is the wavelength of the laser light.

The bias current of a VCSEL diode may be driven by electronics, or other means, to include a superimposed sinusoidal modulation component, to have the form $I_{BIAS} \propto 1 + \beta \sin(\omega_m t)$, where $\beta$ is typically less than 1, and $\omega_m$ is the radian modulation frequency. The radian modulation frequency $\omega_m$ is much less than the frequency of the laser light. When a VCSEL diode is driven with such a bias current, the phase of the optical feedback light returning from the target upon reflection is such that $\Delta\varphi \propto a + b \sin(\omega_m t)$, for constants a and b. Certain specific forms for constants a and b for some embodiments will be presented below.

When the two contributions coherently interfere inside the laser cavity, the phase shift between them can cause their electric fields to interfere, either destructively or constructively. As a result, an output current of the photodetector can have the form $I_{PD} \propto [1 + \delta \cos(\Delta\varphi)]$ in response to the similarly evolving optical output power of the VCSEL diode.

The Fourier series expansion of the function $\cos(a+b \sin(\omega_m t))$ has the form $\mathcal{F}\{\cos(a+b \sin(\omega_m t))\} = J_0(b) \cos(a) - 2J_1(b) \sin(a) \sin(\omega_m t) + 2J_2(b) \cos(a) \cos(2\omega_m t) - 2J_3(b) \sin(a) \sin(3\omega_m t) +$ higher order harmonics, where $J_k$ indicates the Bessel function of the first kind of order k. So for the situation above of a sinusoidally modulated bias current of a VCSEL, the photodetector output current has a harmonics of the radian modulation frequency that can be selected by filtering, and the respective coefficient values that can be determined by demodulation, as explained in relation to FIGS. 9A-C and 10 below.

For a target that had an initial distance $L_0$ from the VCSEL diode, and which has undergone a displacement of $\Delta L$ from $L_0$, the constants a and b above in some cases are given by:

$$a=[4\pi(L_0+\Delta L)/\lambda], \text{ and } b=[-4\pi\Delta\lambda(L_0+\Delta L)/\lambda^2].$$

Certain specific forms of the expansion for $I_{PD}$ may thus be given by:

$I_{PD} \propto$ Baseband Signal –

$$2J_1\left[\frac{-4\pi\Delta\lambda L_0}{\lambda^2}\left(1+\frac{\Delta L}{L_0}\right)\right]\sin\left(\frac{4\pi\Delta L}{\lambda}\right)\sin(\omega_m t)+$$

$$2J_2\left[\frac{-4\pi\Delta\lambda L_0}{\lambda^2}\left(1+\frac{\Delta L}{L_0}\right)\right]\cos\left(\frac{4\pi\Delta L}{\lambda}\right)\cos(2\omega_m t)-$$

$$2J_3\left[\frac{-4\pi\Delta\lambda L_0}{\lambda^2}\left(1+\frac{\Delta L}{L_0}\right)\right]\sin\left(\frac{4\pi\Delta L}{\lambda}\right)\sin(3\omega_m t)+$$

By defining a Q-component of $I_{PD}$ as a low pass filtering and demodulation with respect to the first harmonic, i.e. Q∝Lowpass$\{I_{PD}\times\sin(\omega_m t)\}$, and an I-component as a low pass filtering and demodulation with respect to the second harmonic, i.e. I∝Lowpass$\{I_{PD}\times\cos(2\omega_m t)\}$, one can obtain a first value Q∝ sin $$\left(\frac{4\pi\Delta L}{\lambda}\right),$$

and a second value I∝ cos $$\left(\frac{4\pi\Delta L}{\lambda}\right).$$

Then one can use the unwrapping arctan function (that obtains an angle in any of all four quadrants) to obtain the displacement as $$\Delta L = \frac{\lambda}{4\pi}\arctan(Q/I).$$

In a modification of this implementation of the low pass filtering and demodulation, a Q'-component of $I_{PD}$ can be defined as a low pass filtering and demodulation with respect to the third harmonic, i.e., Q'∝Lowpass$\{I_{PD}\times\sin(\omega_m t)\}$. This can then be used with the I-component derived by filtering and demodulation at the second harmonic, as above, to obtain a modified first value Q'∝ sin $$\left(\frac{4\pi\Delta L}{\lambda}\right),$$

and the second value I∝ cos $$\left(\frac{4\pi\Delta L}{\lambda}\right).$$

Then, as before, one can use the unwrapping arctan function (that obtains an angle in any of all four quadrants) to obtain the displacement as $$\Delta L = \frac{\lambda}{4\pi}\arctan(Q'/I).$$

This modification makes use of frequency components of $I_{PD}$ separate from the original modulation frequency $\omega_m$ applied to the VCSEL diode bias current $I_{BIAS}$. This may reduce the need for filtering and/or isolation of $I_{PD}$ at the original modulation frequency $\omega_m$.

In a still further modification, one can use the form of the Baseband Signal (DC signal component) in the expansion above to obtain an alternative I-component derived by filtering and demodulation at the DC component: I'∝ cos $$\left(\frac{4\pi\Delta L}{\lambda}\right).$$

This alternative I-component can then be used with the Q-component above to obtain $$\Delta L = \frac{\lambda}{4\pi}\arctan(Q/I').$$

Figure 9A:
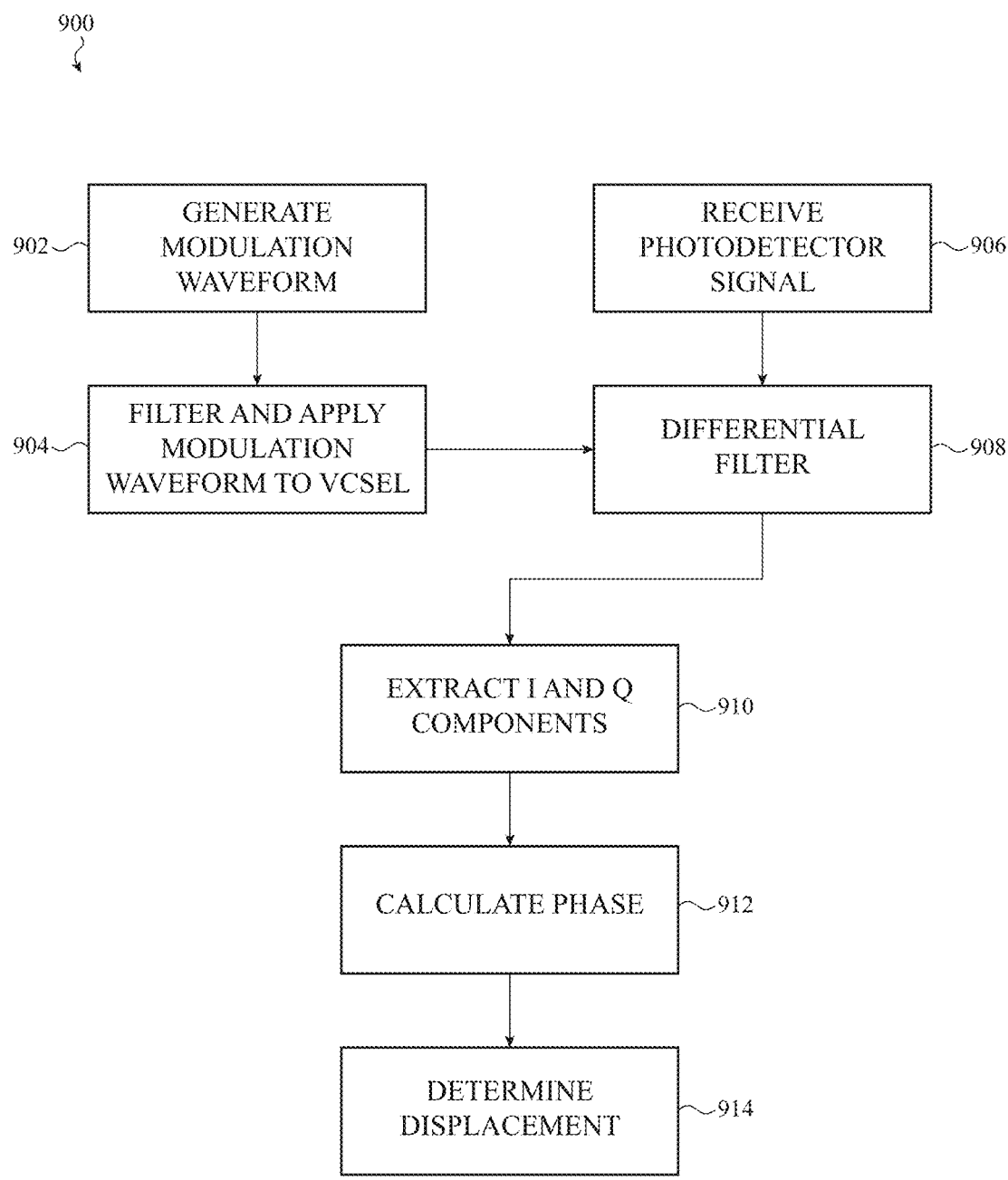
FIG. 9A is a flow chart of a time domain method for determining distances from a light source to an object using self-mixing interferometry, according to an embodiment.

The low pass filtering and demodulations just discussed can be further explained in relation to FIGS. 9A-C and FIG. 10. FIG. 9A is a flow chart of a method 900 for detecting skin deformation and/or skin vibration surface, using distance or displacement measurements.

At block 902, the modulation waveform for the bias current to the VCSEL diode is generated. The generation may involve separately generating a direct current (DC) input signal and a sine wave current input signal with desired modulation frequency $\omega_m$ (in radians), and then summing the two signals to produce $I_{BIAS}$. The two input signals can be generated either by current sources, or from voltage sources that produce $I_{BIAS}$. The generation of the two input signals may initially begin using one or more digital generators, such as digital-to-analog (DAC) converters.

At block 904, the generated modulation waveform may be filtered to reduce signal frequency components not at the desired modulation frequency $\omega_m$. Such filtering may be a digital filtering applied to a digital sine wave source, or an analog filtering of an analog sine wave current input signal. Filtering may also be applied to the DC signal source before being summed with the sine wave current input signal.

The generated modulation waveform is applied to $I_{BIAS}$, modifying the VCSEL diode's emitted laser light accordingly. Self-mixing interference then may occur due to reflections from the location on the user's head.

At block 906, a photodetector receives the VCSEL diode's laser light, and a corresponding signal produced. The signal may be a photodetector current, a voltage of the photodetector, or another interferometric property. Further, as explained above, the photodetector may be integrated with the VCSEL diode itself.

Because the bias current of the VCSEL diode was modulated at desired modulation frequency $\omega_m$, it may well be that the received photodetector signal also has a frequency component at $\omega_m$. At block 908, a scaled version of the modulated form of $I_{BIAS}$ and received photodetector signal may be differenced in a differential filtering to reduce cross-talk or other interferences. The result may be a differenced signal that correlates with the self-mixing interference in the VCSEL diode's laser light.

At block 910, an I and a Q component of the filtered form of the photodetector signal are then extracted. These extractions may be performed by separate mixing (multiplying) of the filtered form of the photodetector signal with separately generated sinusoidal signals at respective frequencies $\omega_m$ and $2\omega_m$, as discussed above. Alternatively, the modifications discussed above based on using either Q' or I' may be used. The mixed signals are then separately low pass filtered.

At block 912, the phase of the I and Q components may be calculated using unwrapping arctan function, as described above. An alternative method of obtaining the phase may also be used. At block 914, the displacement is determined based on the phase, as described above.

Figure 9B:
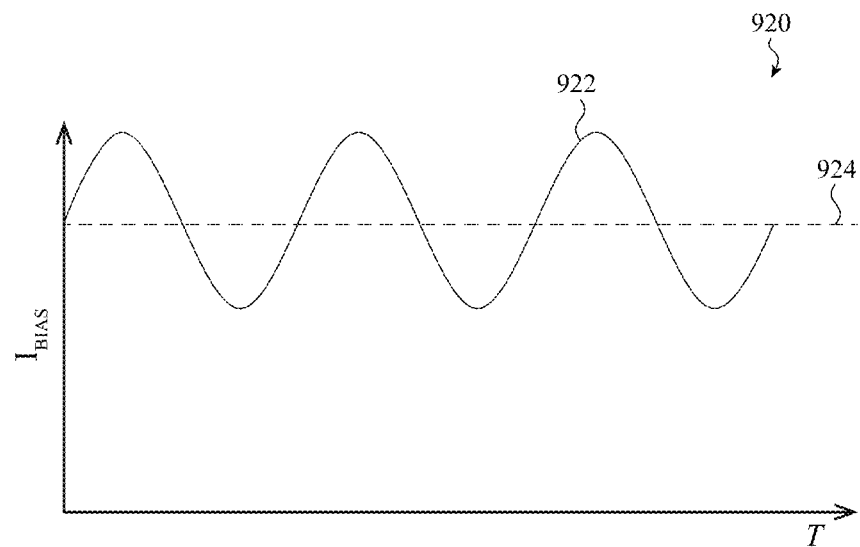
FIGS. 9B-C show time-correlated graphs of signals that may occur in a self-mixing interferometry sensor, according to an embodiment.
Figure 9C:
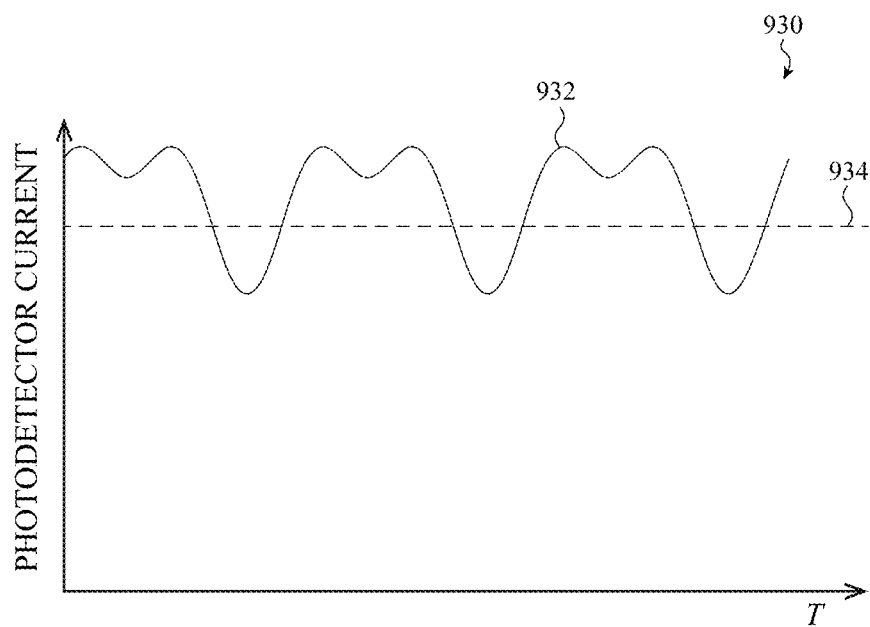

FIGS. 9B-C show two time correlated graphs: 920, 930. Graph 920 shows a plot 922 of a bias current $I_{BIAS}$ of a VCSEL diode modulated by a sine wave at a single frequency. The amplitude of the sinusoidal modulation is only for illustration, and need not correspond to amplitudes used in all embodiments. The bias current $I_{BIAS}$ has its sinusoidal variation about a fixed direct current value, 924.

As a result of the sinusoidal modulation, the output current of a photodetector receiving the VCSEL's self-mixing laser light undergoes a time variation, shown in the plot 932 in the graph 930. The time axes of graphs 926 and 936 are correlated. The plot 932 illustrates that the output current of the photodetector varies around a fixed direct current value 934.

Figure 10:
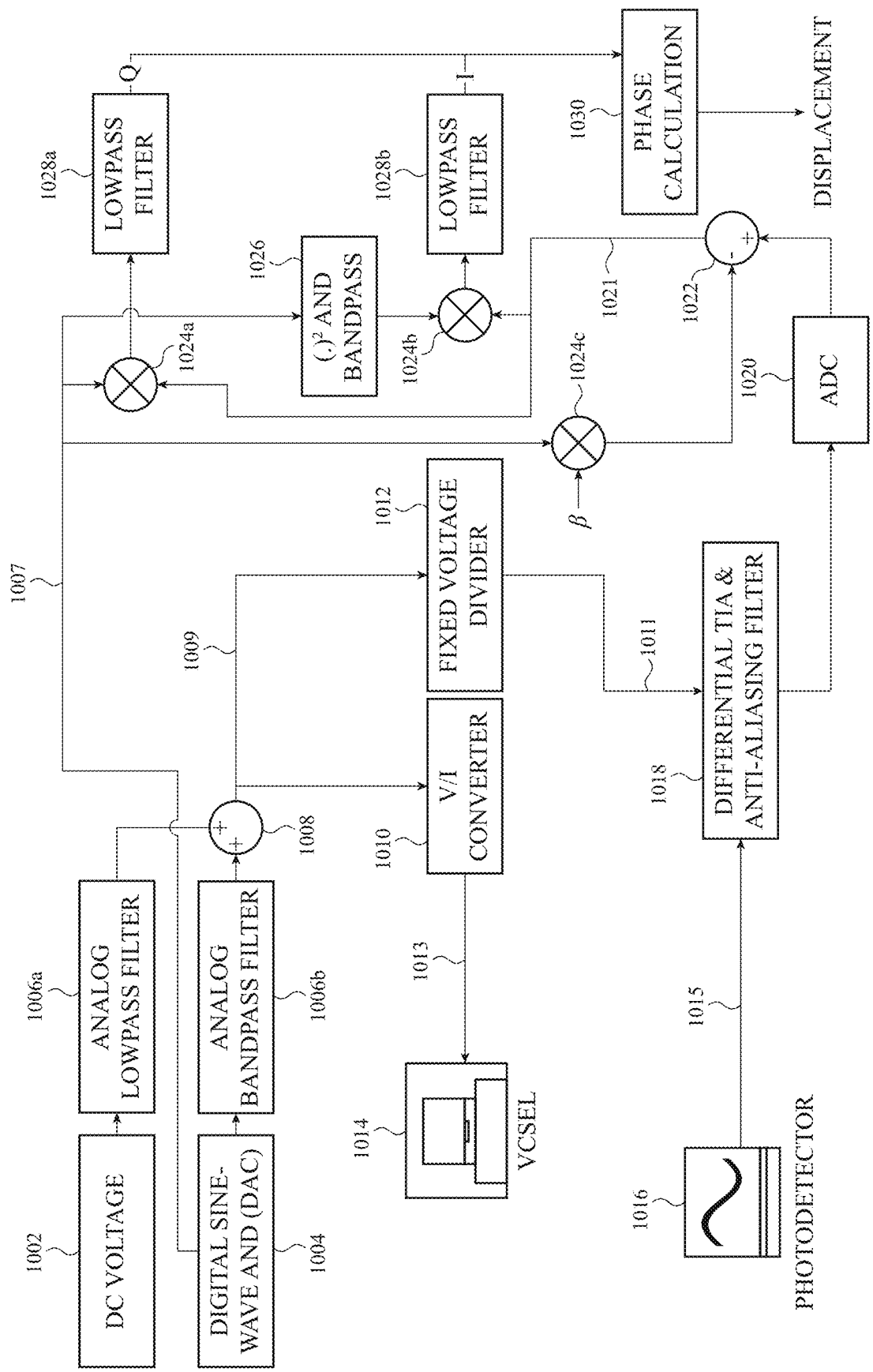
FIG. 10 illustrates a block diagram of a circuit operable to implement the time domain method for determining distances from a light source to an object using self-mixing interferometry, according to an embodiment.

The sinusoidally modulated bias current $I_{BIAS}$ and corresponding photodetector current may arise within the circuit shown in FIG. 10, as now described. Other circuits may be used to implement the time domain I/Q methods as described, and may produce bias currents and respective photodetector currents having respective plots similar to 922 and 932.

FIG. 10 shows an exemplary circuit block diagram that may be used to implement the third family embodiments. Other circuits may also be used, as would be clear to one skilled in the art. The circuit block diagram of FIG. 10 shows the relationships and connections of certain components and sections; other circuits that implement these embodiments may use more or fewer components. As explained in more detail below, FIG. 10 shows components which generate and apply a sinusoidally modulated bias current to a VCSEL. The sinusoidal bias current can generate in a photodetector 1016 an output current depending on the frequency of the sinusoidal bias and the displacement to the target. In the circuit of FIG. 10, the photodetector's 1016 output current is digitally sampled and then multiplied with a first sinusoid at the frequency of the original sinusoidal modulation of the bias current, and a second sinusoid at double that original frequency. The two separate multiplied outputs are then each low pass filtered and the phase calculated. Thereafter the displacement is determined using at least the phase.

The DC voltage generator 1002 is used to generate a constant bias voltage. A sine wave generator 1004 may produce an approximately single frequency sinusoid signal, to be combined with constant voltage. As shown in FIG. 10, the sine wave generator 1004 is a digital generator, though in other implementations it may produce an analog sine wave. The low pass filter 1006A provides filtering of the output of the DC voltage generator 1002 to reduce undesired varying of the constant bias voltage. The bandpass filter 1006B can be used to reduce distortion and noise in the output of the sine wave generator 1004 to reduce noise, quantization or other distortions, or frequency components of its signal away from its intended modulation frequency, $\omega_m$.

The circuit adder 1008 combines the low pass filtered constant bias voltage and the bandpass filtered sine wave to produce on link 1009 a combined voltage signal which, in the embodiment of FIG. 10, has the form $V_0+V_m \sin(\omega_m t)$. This voltage signal is used as an input to the voltage-to-current converter 1010 to produce a current to drive the lasing action of the VCSEL diode 1014. The current from the voltage-to-current converter 1010 on the line 1013 can have the form $I_0+I_m \sin(\omega_m t)$.

The VCSEL diode 1014 is thus driven to emit a laser light modulated as described above. Reflections of the modulated laser light may then be received back within the lasing cavity of VCSEL diode 1014 and cause self-mixing interference. The resulting self-mixing interference light may be detected by photodetector 1016. As described above, in such cases the photocurrent output of the photodetector 1016 on the link 1015 can have the form: $i_{PD}=i_0+i_m \sin(\omega_m t)+\gamma \cos(\varphi_0+\varphi_m \sin(\omega_m t))$. As the I/Q components to be used in subsequent stages are based on just the third term, the first two terms can be removed or reduced by the differential transimpedance amplifier and anti-aliasing (DTIA/AA) filter 1018. To do such a removal/reduction, a proportional or scaled value of the first two terms is produced by the voltage divider 1012. The voltage divider 1012 can use as input the combined voltage signal on the link 1009 produced by the circuit adder 1008. The output of the voltage divider 1012 on link 1011 can then have the form $\alpha(V_0+V_m \sin(\omega_m t))$. The photodetector current and this output of the voltage divider 1012 can be the inputs to the DTIA/AA filter 1018. The output of the DTIA/AA filter 1018 can then be, at least mostly, proportional to the third term of the photodetector current.

The output of the DTIA/AA filter 2018 may then be quantized for subsequent calculation by the analog-to-digital converter (ADC) block 1020. Further, the output of the ADC block 1020 may have residual signal component proportional to the sine wave originally generated by the sine wave generator 1004. To filter this residual signal component, the originally generated sine wave can be scaled (such as by the indicated factor of $\beta$) at multiplier block 1024C, and then subtracted from the output of ADC block 1020. The filtered output on link 1021 may have the form $A+B \sin(\omega_m t)+C \cos(2\omega_m t)+D \sin(\omega_m t)+\ldots$, from the Fourier expansion discussed above. The filtered output can then be used for extraction of the I/Q components by mixing.

The digital sine wave originally generated by sine wave generator 1004 onto link 1007 is mixed (multiplied) by the multiplier block 1024a with the filtered output on link 1007. This product is then low pass filtered at block 1028a to obtain the Q component discussed above.

Also, the originally generated digital sine wave is used as input into the squaring/filtering block 1026 to produce a digital cosine wave at a frequency double that of the originally produced digital sine wave. The digital cosine wave is then mixed (multiplied) at the multiplier component 1024b with the filtered output of the ADC block 1020 on link 1021. This product is then low pass filtered at component 1028b to obtain the I component discussed above.

The Q and the I components are then used by the phase calculation component 1030 to obtain the phase from which the displacement of the target can be calculated, as discussed above.

One skilled in the art will appreciate that while the embodiment shown in FIG. 10 makes use of the digital form of the originally generated sine wave produced by sine wave generator 1004 onto link 1007, in other embodiments the originally generated sine wave may be an analog signal and mixed with an analog output of the DTIA/AA 1018.

The circuit of FIG. 10 can be adapted to implement the modified I/Q method described above that uses $Q' \propto \text{Lowpass}\{I_{PD} \times \sin(\omega_m t)\}$. Some such circuit adaptations can include directly generating both mixing signals $\sin(2\omega_m t)$ and $\sin(\omega_m t)$, and multiplying each with the output of the ADC block 1020, and then applying respective low pass filtering, such as by the blocks 1028a,b. The differential TIA and anti-aliasing filter may then be replaced by a filter to remove or greatly reduce the entire component of $I_{PD}$ at the original modulation frequency $\omega_m$. One skilled in the art will recognize other circuit adaptations for implementing this modified I/Q method.

In additional and/or alternative embodiments, the I/Q time domain based methods just described may be used with the spectrum based methods of the first family of embodiments. The spectrum methods of the first family can be used at certain times to determine the absolute distance to the target, and provide a value of $L_0$. Thereafter, during subsequent time intervals, any of the various I/Q methods just described may be used to determine $\Delta L$.

In additional and/or alternative embodiments, the spectrum methods based on triangle wave modulation of a bias current of a VCSEL may be used as a guide for the I/Q time domain methods. The I/Q methods operate optimally in the case that $J_1(b)=J_2(b)$, so that the I and Q components have the same amplitude. However, b depends on the distance L. An embodiment may apply a triangle wave modulation to the VCSEL's bias current to determine a distance to a point of interest. Then this distance is used find the optimal peak-to-peak sinusoidal modulation of the bias current to use in an I/Q approach. Such a dual method approach may provide improved signal-to-noise ratio and displacement accuracy obtained from the I/Q method.

Figure 11:
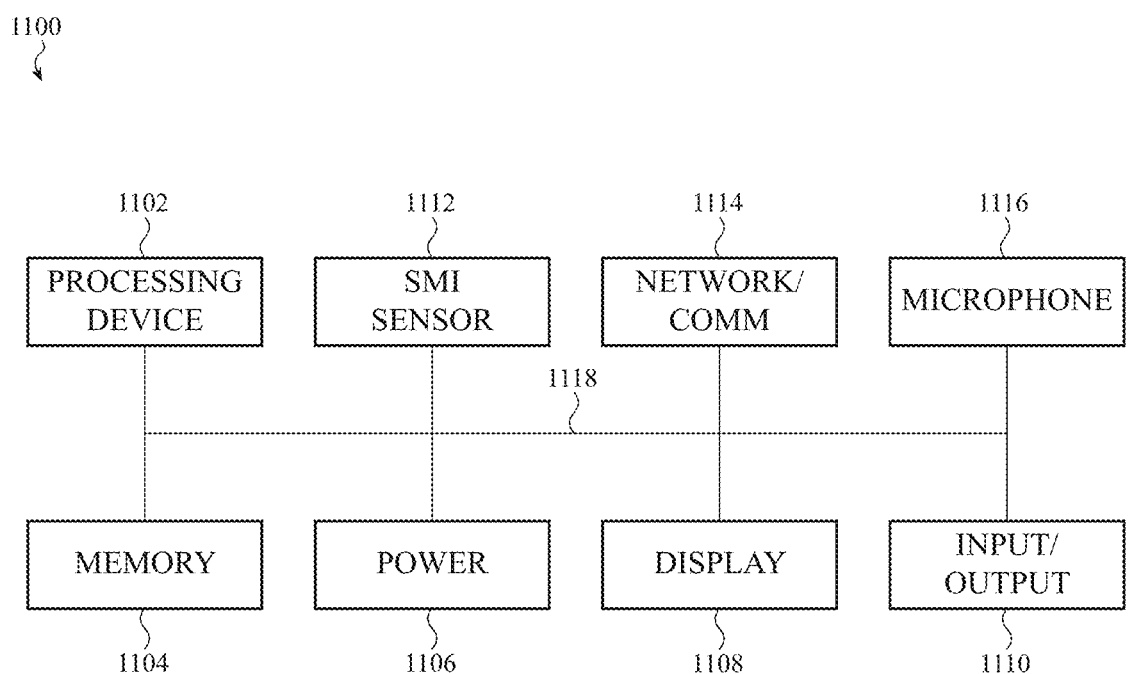
FIG. 11 illustrates a block diagram of an electronic device that is configured to detect user input, according to an embodiment.

Referring now to FIG. 11, there is shown an exemplary structural block diagram of components of an electronic device 1100, such as the embodiments described above. The block diagram is exemplary only; various embodiments described above may be implemented using other structural components and configurations. The electronic device 1100 can include one or more processors or processing unit(s) 1102, storage or memory components 1104, a power source 1106, a display 1108 (which may display or indicate an operating status, or display the image being projected in an AR/VR system), an input/output interface 1110, one or more sensors such as microphones, a network communication interface 1114, and one or more self-mixing interferometry (SMI) sensors 1112, as described above. Either of the display 1108 or the input/output interface 1110 may include input touch screens, buttons, sliders, indicator lights, etc., by which a user can control operation of the electronic device 1100. These various components will now be discussed in turn below.

The one or more processors or processing units 1102 can control some or all of the operations of the electronic device 1100. The processor(s) 1102 can communicate, either directly or indirectly, with substantially all of the components of the electronic device 1100. In various embodiments, the processing units 1102 may receive the self-mixing interferometry signals from the SMI sensors 1112, such as self-mixing interferometry signals from any or all of the photodetectors, VCSELs, and other electronics of the imaging and SMI sensors 1112. Such signals may include those that correspond to the interferometric parameters, and perform any of the methods, or parts of the methods, discussed above.

For example, one or more system buses 1118 or other communication mechanisms can provide communication between the processor(s) or processing units 1102, the storage or memory components 1104 (or just "memory"), the power source 1106, the display 1108, the input/output interface 1110, the SMI sensor(s) 1112, the network communication interface 1114, and the microphone(s) 1116. The processor(s) or processing units 1102 can be implemented as any electronic device capable of processing, receiving, or transmitting data or instructions. For example, the one or more processors or processing units 1102 can be a microprocessor, a central processing unit (CPU), an application-specific integrated circuit (ASIC), a digital signal processor (DSP), or combinations of multiple such devices. As described herein, the term "processor" or "processing unit" is meant to encompass a single processor or processing unit, multiple processors, multiple processing units, or other suitably configured computing element or elements.

The memory 1104 can store electronic data that can be used by the electronic device 1100. For example, the memory 1104 can store electrical data or content such as, for example, audio files, document files, timing signals, algorithms, and image data. The memory 1104 can be configured as any type of memory. By way of example only, memory 1104 can be implemented as random access memory, read-only memory, Flash memory, removable memory, or other types of storage elements, in any combination.

The power source 1106 can be implemented with any device capable of providing energy to the electronic device 1100. For the wearable electronic devices described above, the power source 1106 can be a battery, such as a lithium, alkali, or other type.

The display 1108 may provide an image or video output for certain of the electronic devices 1100, such as the AR/VR systems described above. The display 1108 can be any appropriate size for a wearable electronic device. The display 1108 may also function as a user touch input surface, in addition to displaying output from the electronic device 1100. In these embodiments, a user may press on the display 1108 or gesture toward a portion of the image projected in the AR/VR system in order to provide user input to the electronic device 1100. Such user inputs may be in addition to the user inputs based on the detection skin deformations and skin vibrations described above.

The input/output interface 1110 can be configured to allow a user to provide settings or other inputs to the various embodiments described above. For example, the electronic device 1100 may include one or more user settable switches or buttons, such as to adjust a volume. The input/output interface 1110 may also be configured with one or more indicator lights to provide a user with information related to operational status of the electronic device.

In addition to the SMI sensors 1112, the electronic device 1100 may include one or more microphones 1116, as described in relation to FIGS. 2B-C. Examples of microphones include, but are not limited to, piezoelectric, condenser, ribbon, and other technologies known to one skilled in the art.

The network communication interface 1114 can facilitate transmission of data to a user or to other electronic devices. For example, the network communication interface 1114 can receive data from a network or send and transmit electronic signals via a wireless connection. Examples of wireless connections include, but are not limited to, Bluetooth, WiFi, or another technology. In one or more embodiments, the network communication interface 1114 supports multiple network or communication mechanisms. For example, the network communication interface 1114 can pair with another device over a Bluetooth network to transfer signals to the other device while simultaneously receiving signals from a WiFi or other wired or wireless connection.

Other examples and implementations are within the scope and spirit of the disclosure and appended claims. For example, features implementing functions may also be physically located at various positions, including being distributed such that portions of functions are implemented at different physical locations. As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided. Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable device, comprising:
a frame configured to attach the wearable device to a user;
a self-mixing interferometry sensor mounted to the frame and configured to emit a beam of light; and
a command interpreter configured to:
  receive a self-mixing interferometry signal from the self-mixing interferometry sensor; and
  detect skin vibration information in the self-mixing interferometry signal;
wherein:
the frame is configured to direct the beam of light toward a head of the user; and
the command interpreter is configured to identify and authenticate a command using the skin vibration information.

2. The wearable device of claim 1, wherein the wearable device is an earbud further comprising:
a microphone; and
an in-ear speaker; and wherein:
the self-mixing interferometry sensor directs the beam of light toward a location in an ear of the user; and
the command interpreter identifies a voiced command of the user using the skin vibration information.

3. The wearable device of claim 1, wherein:
the wearable device is an eyeglasses set;
the self-mixing interferometry sensor is mounted to an arm of the eyeglasses set and directs the beam of light toward a location proximate to a temporal bone of the user; and
the command interpreter identifies a voiced command of the user based on the skin vibration information.

4. The wearable device of claim 1, wherein the skin vibration information includes temporomandibular joint movement information.

5. The wearable device of claim 4, wherein:
the wearable device is a headphone;
the self-mixing interferometry sensor directs the beam of light toward a location on the user's head proximate to a temporomandibular joint of the user; and
the command interpreter identifies the temporomandibular joint movement information as a silent gesture command of the user.

6. The wearable device of claim 4, wherein:
the wearable device is a visual display headset;
the self-mixing interferometry sensor is a first self-mixing interferometry sensor;
the beam of light is a first beam of light;
the self-mixing interferometry signal is a first self-mixing interferometry signal;
the first self-mixing interferometry sensor directs the beam of light toward a first location on the user's head proximate to a temporomandibular joint of the user;
the command interpreter identifies the temporomandibular joint movement information as a silent gesture command of the user;
the wearable device comprises a second self-mixing interferometry sensor that directs a second beam of light toward a second location on the user's head proximate to a parietal bone; and
the command interpreter is configured to receive a second self-mixing interferometry signal from the second self-mixing interferometry sensor; wherein:
the second self-mixing interferometry signal includes skin vibration information; and
the command interpreter is configured to identify a voiced command encoded in the skin vibration information of the second self-mixing interferometry signal.

7. The wearable device of claim 1, wherein:
the beam of light is a laser light beam emitted by a laser diode;
a bias current of the laser diode is modulated with a sine wave; and
the command interpreter is configured to use a time domain I/Q analysis to identify the command encoded in the skin vibration information.

8. The wearable device of claim 1, wherein:
the beam of light is a laser light emitted by a laser diode;
a bias current of the laser diode is modulated with a triangle wave; and
the command interpreter is configured to use a spectrum analysis to identify the command encoded in the skin vibration information.

9. A device, comprising:
a head-mountable frame configured to be worn by a user;
a self-mixing interferometry sensor mounted to the head-mountable frame and configured to emit a beam of light toward a location on the user's head;
a microphone;
a command interpreter configured to receive an output of the microphone and recognize a voiced command of the user; and a bioauthentication circuit configured to:
  determine skin vibration information from the received light of the emitted beam of light; and
  authenticate the voiced command using the skin vibration information of the self-mixing interferometry sensor.

10. The device of claim 9, wherein:
the received light includes skin deformation information;
the bioauthentication circuit is operable to:
  detect, using at least the skin deformation information, that the user was speaking during a time interval of the received output of the microphone; and
  authenticate the voiced command using the detection.

11. The device of claim 10, wherein authentication of the voiced command further includes detecting a correlation of the voiced command of the user with a voice pattern detected in the skin vibration information.

12. The device of claim 9, wherein the device is an earbud further comprising:
an in-ear speaker; and
a radio transmitter; wherein:
the device transmits the voiced command using the radio transmitter upon authentication.

13. The device of claim 9, wherein:
the device is a headphone;
the location on the user's head is proximate to at least one of a temporal bone and a parietal bone; and
the device implements the voiced command upon authentication.

14. The device of claim 9, wherein:
the beam of light is a laser light beam emitted by a laser diode;
the bioauthentication circuit is configured to authenticate the voiced command using at least one of:
a time domain I/Q analysis of the received light when a sine wave modulation is applied to a bias current of the laser diode, and
a spectrum analysis of the received light when a triangle wave modulation is applied to the bias current of the laser diode.

15. A device, comprising:
a head-mountable frame configured to be worn by a user;
a self-mixing interferometry sensor mounted to the head-mountable frame and configured to emit a beam of light toward skin of the user and determine skin vibration information from a detected portion of the beam of light;
a microphone configured to produce an audio signal; and
an audio conditioning circuit configured to modify the audio signal using a self-mixing interferometry signal of the self-mixing interferometry sensor to detect intervals of speech using the skin vibration information and suppress background noise in the audio signal.

16. The device of claim 15, wherein the device is an earbud further comprising:
an in-ear speaker; and
a radio transmitter; wherein:
the device transmits the audio signal only during the detected time intervals of speech of the user.

17. The device of claim 15, wherein:
the device is a headphone further comprising a radio transmitter;
the self-mixing interferometry sensor directs the beam of light toward a location on the user's head proximate to at least one of the a temporal bone and the a parietal bone; and
the device transmits the audio signal only during the detected time intervals of speech of the user.

18. The device of claim 15, wherein:
the beam of light is a laser light beam emitted by a laser diode;
the audio conditioning circuit is configured to modify the audio signal using at least one of:
a time domain I/Q analysis of the self-mixing interferometry signal when a sine wave modulation is applied to a bias current of the laser diode, and
a spectrum analysis of the self-mixing interferometry signal when a triangle wave modulation is applied to the bias current of the laser diode.

* * * * *